United States Patent [19]

Fujita et al.

[11] Patent Number: 5,873,932
[45] Date of Patent: Feb. 23, 1999

[54] METHOD FOR IMPROVING LIGHT-FASTNESS OF REVERSIBLE THERMOCHROMIC COMPOSITIONS AT THE TIME OF COLOR DEVELOPMENT

[75] Inventors: Katsuyuki Fujita, Bisai; Yutaka Shibahashi, Nagoya; Yoshiaki Ono, Gifu, all of Japan

[73] Assignee: The Pilot Ink Co., Ltd., Nagoya, Japan

[21] Appl. No.: 760,209

[22] Filed: Dec. 4, 1996

[30] Foreign Application Priority Data

Dec. 27, 1995 [JP] Japan .................................. 7-354711

[51] Int. Cl.⁶ .................................................. C09D 11/02
[52] U.S. Cl. .................................. 106/31.18; 106/31.16; 106/31.17
[58] Field of Search .............................. 106/31.18, 31.17, 106/31.16

[56] References Cited

U.S. PATENT DOCUMENTS 4,865,648  9/1989  Kito et al. .................................. 106/21

OTHER PUBLICATIONS

Hawley's Condensed Chemical Dictionary, 12th ed. p. 154, 1993.

*Primary Examiner*—Deborah Jones
*Attorney, Agent, or Firm*—Fitzpatrick, Cella, Harper & Scinto

[57] ABSTRACT

A method of causing metachromatism by the use of a reversible thermochromic composition comprising (a) an electron donating compound, (b) an electron accepting compound and (c) a metachromatic temperature adjuster, wherein;

(d) an electron accepting, light-fastness providing agent represented by Formula I:

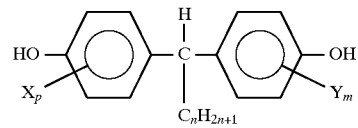

wherein n represents an integer of 5 to 17 to form a straight-chain or branched alkyl group; X and Y each represent a straight-chain or branched alkyl group having 1 to 4 carbon atoms, or a halogen atom; and p and m each represent an integer of 0 to 3;

is brought into presence in an amount of 0.3 part by weight to 70 parts by weight based on 1.0 part by weight of the component-(a) electron donating compound.

The light-fastness of the reversible thermochromic composition at the time of color development can be greatly improved.

9 Claims, 20 Drawing Sheets

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 20°C)
(TEST SAMPLE: COLOR-DEVELOPED STATE)

COLORING DENSITY ATTENUATION (XENOTEST)
(IN-MACHINE TEMP.: 20°C)
(TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 40°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (XENOTEST)
(IN-MACHINE TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR–DEVELOPED STATE)

COLORING DENSITY ATTENUATION (NORTHLIGHT TEST)
(AMBIENT TEMP.: 20°C
TEST SAMPLE: COLOR–DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
$$\begin{pmatrix} \text{AMBIENT TEMP.}: 20°C \\ \text{TEST SAMPLE}: \text{COLOR}-\text{DEVELOPED STATE} \end{pmatrix}$$

COLORING DENSITY ATTENUATION (NORTHLIGHT TEST)
$$\begin{pmatrix} \text{AMBIENT TEMP.}: 20°C \\ \text{TEST SAMPLE}: \text{COLOR}-\text{DEVELOPED STATE} \end{pmatrix}$$

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 20°C
TEST SAMPLE: COLOR-DEVELOPED STATE)

COLORING DENSITY ATTENUATION (NORTHLIGHT TEST)
(AMBIENT TEMP.: 5°C
TEST SAMPLE: COLOR-DEVELOPED STATE)

COLORING DENSITY ATTENUATION (NORTHLIGHT TEST)
(AMBIENT TEMP.: 5°C
TEST SAMPLE: COLOR-DEVELOPED STATE)

COLORING DENSITY ATTENUATION (NORTHLIGHT TEST)
(AMBIENT TEMP.: 5°C
TEST SAMPLE: COLOR-DEVELOPED STATE)

COLORING DENSITY ATTENUATION (NORTHLIGHT TEST)
(AMBIENT TEMP.: 5°C
TEST SAMPLE: COLOR-DEVELOPED STATE)

COLORING DENSITY ATTENUATION (NORTHLIGHT TEST)
(AMBIENT TEMP.: 20 C°
TEST SAMPLE: COLOR - DEVELOPED STATE)

COLORING DENSITY ATTENUATION (NORTHLIGHT TEST)
(AMBIENT TEMP.: 20°C
TEST SAMPLE: COLOR - DEVELOPED STATE)

METHOD FOR IMPROVING LIGHT-FASTNESS OF REVERSIBLE THERMOCHROMIC COMPOSITIONS AT THE TIME OF COLOR DEVELOPMENT

BACKGROUND OF THE INVENTION

1. Field of the Invention

This invention relates to a method for improving the light-fastness (color fastness to light) of reversible thermochromic compositions at the time of color development by bringing into presence an electron accepting, special light-fastness providing agent.

2. Description of the Related Art

Thermochromic compositions comprised of a combination of electron donating compounds with electron accepting compounds are known in the art as disclosed, e.g., in U.S. Pat. No. 3,560,229. In such compositions, their metachromatic temperatures depend on the types of the both compounds used in combination, and hence, it has been very difficult to obtain compositions capable of varying in color at the desired temperature.

The present inventors have invented a method in which a specific alcohol, ester or ketone is used as a metachromatic temperature adjuster to adjust the metachromatic temperature to the desired temperature (Japanese Patent Publications No. 51-44706, No. 51-44708, No. 52-7764 and No. 6-59746).

The invention previously made by the present inventors is an epock-making invention in view of the advantages such that the metachromatic temperature can be controlled to any desired temperature even if the combination of an electron donating compound with an electron accepting compound is not varied.

However, the invention made by the combination of these electron donating compound and electron accepting compound has a disadvantage that the electron donating compound does not have a high light-fastness and hence any thermochromic compositions making use of it can not have a high light-fastness. Accordingly, the color having varied may become faded by light or, in an extreme instance, may become completely decolored.

In conventional attempts, ultraviolet light absorbers are mixed so that light-fastness can be imparted to compounds. When, however, an ultraviolet light absorber is mixed in thermochromic compositions comprised of an electron donating compound and an electron accepting compound, it brings about an improvement in light-fastness when the compositions are in the color-extinguished state but is almost not effective when they are in the color-developed state, and is not effective at all especially with regard to indirect light. When a metallic luster pigment and an ultraviolet light absorber are used in combination to intercept part of visible light rays, they bring about a dramatic improvement in light-fastness when the compositions are in the color-extinguished state but are less effective in the color-developed state, and are not effective at all especially with regard to indirect light. Also, hindered amine type, hindered phenol type, sulfur type or nickel complex type light stabilizers are almost not effective either when the compositions are in the color-extinguished state or when they are in the color-developed state.

SUMMARY OF THE INVENTION

The present invention was made in order to solve the problems involved in the prior art. Accordingly, an object of the present invention is to provide a method for improving the light-fastness of a reversible thermochromic composition when it is in the color-developed state.

To achieve the above object, the present invention provides a method of causing metachromatism by the use of a reversible thermochromic composition comprising;

(a) an electron donating compound;

(b) an electron accepting compound; and (c) a metachromatic temperature adjuster;

wherein;

(d) an electron accepting, light-fastness providing agent represented by Formula I:

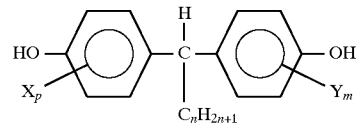

wherein n represents an integer of 5 to 17 to form a straight-chain or branched alkyl group; X and Y each represent a straight-chain or branched alkyl group having 1 to 4 carbon atoms, or a halogen atom; and p and m each represent an integer of 0 to 3;

is brought into presence in an amount of 0.3 part by weight to 70 parts by weight based on 1.0 part by weight of the component-(a) electron donating compound to improve the light-fastness of the reversible thermochromic composition at the time of color development.

The above and other objects, features and advantages of the present invention are described in or will become apparent from the following description of the preferred embodiments.

DESCRIPTION OF THE PREFERRED EMBODIMENTS

Figure 1:
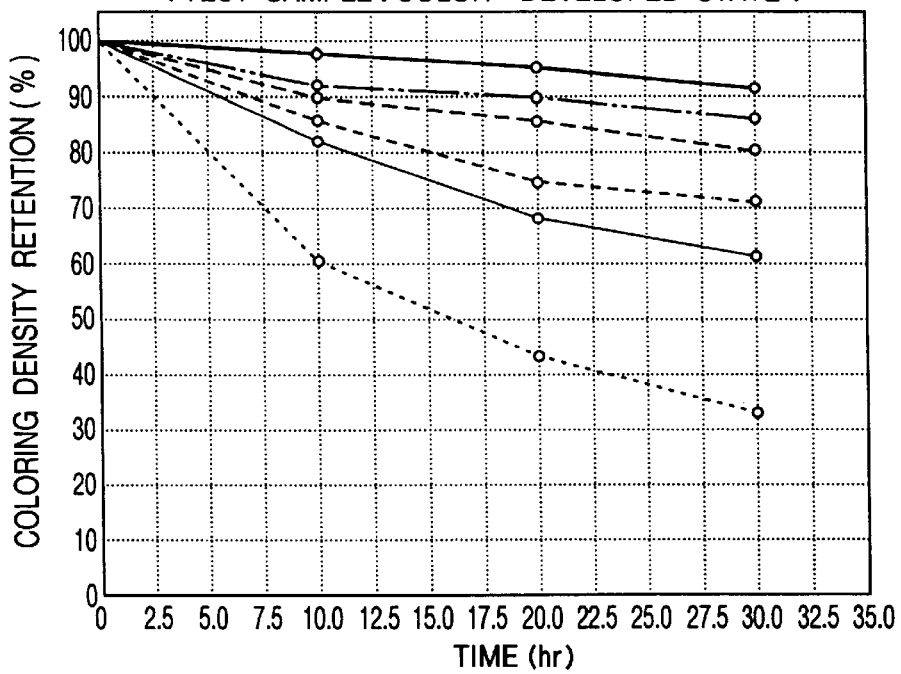
FIGS. 1 to 40 are graphs showing the effect of improvement in light-fastness, attributable to the present invention.

The present invention is a method of effecting metachromatism by the use of a reversible thermochromic composition comprising an electron donating compound [herein after often "component (a)"], an electron accepting compound [herein after often "component (b)"] and a metachromatic temperature adjuster [herein after often "component (c)"], in which method a electron accepting, specific light-fastness providing agent [herein after often "component (d)"] represented by the following Formula I is brought into presence in the composition in an amount of from 0.3 part by weight to 70 parts by weight based on 1.0 part by weight of the electron donating compound to thereby improve the light-fastness of the composition at the time of color development. In particular, the light-fastness providing agent may preferably be in an amount of from 2.0 parts by weight to 7.0 parts by weight. Formula I:

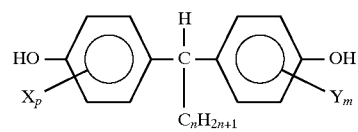

wherein n represents an integer of 5 to 17 to form a straight-chain or branched alkyl group; X and Y each represent a straight-chain or branched alkyl group having 1 to 4 carbon atoms, or a halogen atom; and p and m each represent an integer of 0 to 3;

The electron donating compound is typified by leuco dyes. The electron donating compound is ionized and comes into an ionized state when brought into an electron-donated state (in which the compound has donated an electron), i.e., in terms of the leuco dyes, when brought into a color-developed state.

When it comes into an ionized state in this way, the light-fastness decreases to cause a lowering of electron donating performance because of light, resulting in a deterioration of reversible thermochromic properties.

Such a decrease in light-fastness when it is in the color-developed state is greatly caused by visible light rays.

When the compound is in a color-extinguished state, it is not ionized and is in a colorless molecular state, and hence the compound is almost not affected by visible light rays.

Ultraviolet light absorbers, metallic luster pigments, antioxidants, aging-preventive agents and so forth which are used to improve light-fastness are effective for improving light-fastness of leuco dyes when they are in the color-extinguished state, but very less effective when they are in the color-developed state.

Such light-fast additives conventionally used have the action to improve light-fastness of substances standing in a molecular state. Almost all substances usually used at places where they may receive light are in a molecular state, and it is very rare for them to be used in an ionic state. Hence, the ultraviolet light absorbers or the like have been well effective.

However, the reversible thermochromic composition used in the present invention belongs to a special field of technique, where the ion-donated substance comes into an ionic state, and the composition develops color in such a state. When this composition is in the color-extinguished state, it stands in a molecular state, where it is colorless and does not absorb visible light rays when it is in the molecular state. Hence, its light-fastness can be well effectively improved if only ultraviolet rays are cut. On the other hand, the composition stands colored when it is in the ionic state. Hence the light-fastness can not be well effectively improved if ultraviolet rays only are cut, and visible light rays must be further cut.

The color-developed state and color-extinguished state of the reversible thermochromic composition used in the present invention will be described below.

The components (a), (b) and (c) of the reversible thermochromic composition used in the present invention are not ionized compounds in the state they are actually handled, and are all molecular compounds. In the reversible thermochromic composition in which these components are uniformly mixed, the components (a) and (b) are ionized and combined to come into the color-developed state at a temperature not higher than the metachromatic temperature. On the other hand, at a temperature not lower than the metachromatic temperature, the ionic bond between the components (a) and (b) disappears, and the components (a) and (b) become independent from each other to turn into molecular compounds and come into the color-extinguished state. The component-(b), which is a phenolic hydroxyl group, undergoes solvation upon its dissolution in the component-(c) metachromatic temperature adjuster to have a strong affinity for the component (c). In the transitional stage of metachromatism, the components (a) and (b) are presumed to come into a state intermediate between the ionized state and the molecular state and to stand in a weak ionic bond in the state they are ionized to a certain extent. The color development occurs if only they come into an even slightly ionized state, and hence the light-fastness in the color-developed state comes into question. Thus, with regard to the light-fastness, the transitional state is regarded as the color-developed state.

Hence, the light-fast additives such as ultraviolet light absorbers conventionally used are effective for improving the light-fastness of compositions when they are in the color-extinguished state, but are not so much effective for improving the light-fastness of compositions when they are in the color-developed state.

It, however, has been found that the light-fastness is greatly improved and no aging is caused by either visible light or indirect light when the light-fastness providing agent represented by Formula I, used in the present invention, is brought into presence at the time of color development.

The reason why the reversible thermochromic composition used in the present invention is greatly aged by visible light and indirect light when it is in the color-developed state and why it is not aged by such light when it is in the color-extinguished state has not been well elucidated by an academic approach. However, the present inventors have discovered that the component-(d) light-fastness providing agent represented by Formula I, as having electron accepting properties, has an tonically strong mutual action with the component-(a) electron donating, color forming organic compound at a temperature not higher than the metachromatic temperature and can form the color-developed state, when it is present together with the component-(a) electron donating, color forming organic compound.

Of course, the component-(a) electron donating, color forming organic compound has also an tonically strong mutual action with the conventional, component-(b) electron accepting compound to form the color-developed state. However, it is presumed that the ionic structure ascribable to the ionic mutual action when the composition comes into the color-developed state has a great difference in stability to light between the case of mutual action of (a) with (b) and the case of mutual action of (a) with (d).

The component-(d) light-fastness providing agent has a long-chain alkyl group, and has a great solubility in the component-(c) metachromatic temperature adjuster, which has a strong aromatic atmosphere. Hence, even in a solid where the component-(c) metachromatic temperature adjuster stands crystallized, having a temperature not higher than the metachromatic temperature, the component-(d) light-fastness providing agent having strongly acted with the component-(a) electron donating, color forming organic compound to have formed an ionic state is stabilized at its long-chain alkyl group moiety in the solid where the component-(c) metachromatic temperature adjuster stands crystallized, being stabilized in such a state that it has weakly mutually acted with the component-(c) metachromatic temperature adjuster, and, as the result, the whole structure standing ionic becomes stable to light, as so presumed. Hence, it is also presumed that the component-(a) electron donating, color forming organic compound which stands ionic forms as a whole such a state that, even when it absorbs visible light rays to cause photo-excitation, it does not undergo photo-decomposition or photo-oxidation and releases its energy to return to the original state on a stable cycle.

Structures having a long-chain alkyl group exist in variety. Among them, the structure represented by Formula I exhibits a superior light-fastness improving effect. The reason therefor is also presumed that, since the compound of Formula I has an unbranched structure wherein a hydrogen atom is attached to one side of the central carbon and a long-chain alkyl group to the other side thereof, the component-(c) metachromatic temperature adjuster has an especially good adaptability, i.e., stability, in the crystallized solid.

On the other hand, in the case of the conventional component-(b) electron accepting compound, the alkyl group is short, and it is presumed that the compound has less adaptability in the solid in which the component-(c) metachromatic temperature adjuster is crystallized, having the temperature not higher than the metachromatic temperature, and an ionic-state structure of the components (a) and (b) is present in the state of poor stability. It is therefore presumed that, once the component-(a) electron donating, color forming organic compound which stands ionic absorbs visible light rays to cause photo-excitation, the reaction of photo-decomposition or photo-oxidation preferentially takes place to accelerate deterioration.

The component-(d) light-fastness providing agent used in the present invention has the electron accepting properties in itself, and must be brought into presence in an amount not less than 0.3 part by weight based on 1.0 part by weight of the electron donating compound when the reversible thermochromic composition is in the color-developed state. If the light-fastness providing agent is present in an amount less than 0.3 part by weight based on 1.0 part by weight of the electron donating compound when the reversible thermochromic composition is in the color-developed state, no sufficient light-fastness can be obtained.

The component-(d) light-fastness providing agent represented by Formula I, used in the present invention, is a bisphenol compound or bis(hydroxyphenyl) compound comprising an alkyl group to which two phenyl rings each having a hydroxyl group is attached through the terminal carbon atom. This compound is characterized in that the alkyl group except the terminal carbon atom has 5 to 17 carbon atoms (n). If the number of carbon atoms is less than 5, the alkyl group is so short that the solubility in the component-(c) metachromatic temperature adjuster, having a strong aromatic atmosphere, may be insufficient and a well stabilized structure can not be obtained in the solid atmosphere having a temperature not higher than the metachromatic temperature. If on the other hand the number of carbon atoms is more than 17, the alkyl group is so excessively long that the solubility in the component-(c) metachromatic temperature adjuster, having a strong aromatic atmosphere, may be excessive and, taking account of practical use, the resulting composition can not be practical because it has a weak color forming power and also a poor metachromatic sensitivity.

It is most preferable for the alkyl group to be a straight-chain alkyl group. In the case when the alkyl group is branched, the branch may preferably be as short as possible.

To each of the phenyl rings, a straight-chain or branched alkyl group or a halogen may be attached as a substituent. So long as the alkyl group to which the phenyl groups are attached is the one described above, substantially the same light-fastness can be exhibited.

Since the component-(d) light-fastness providing agent used in the present invention has also the electron accepting properties in itself, its use enables control of the amount of the component-(b) electron accepting compound to be used, or in some cases allows replacement of the latter with the former.

In the case when the component-(d) light-fastness providing agent represented by Formula I is replaced with the component-(b) electron accepting compound, that is, in the case when the component-(d) light-fastness providing agent is used as the component-(b) electron accepting compound, it must be used in an amount of from 0.3 part by weight to 70 parts by weight based on 1.0 part by weight of the component-(a) electron donating compound. This is because, in the case when only the component-(d) light-fastness providing agent represented by Formula I is used as the component-(b) electron accepting compound, the former compound (d) commonly has a larger molecular weight than the latter electron accepting compound (b) because of the former's long-chain alkyl group. Thus, the equivalent weight of the phenolic hydroxyl group (molecular weight/the number of phenolic hydroxyl group per molecule) reacting with the component-(a) electron donating compound is larger than the component-(b) electron accepting compound, and hence the component (d) must be used in an amount larger than the case when the component (b) is used as the electron accepting compound. The component-(d) light-fastness providing agent may particularly preferably be used in an amount of from 2.0 to 7.0 parts by weight.

The reason why the reversible thermochromic composition formed of the electron accepting compound and the electron donating compound in combination has a very poor light-fastness to indirect light and visible light when it is in the color-developed state, in particular, why it has a poor light-fastness to indirect light has not been well elucidated by an academic approach. Presumably, this is because the electron donating compound stands ionic when the composition is in the color-developed state.

It, however, is still unclear why the composition has a great light-fastness to visible light and indirect light when it is in the color-extinguished state in the molecular state and why it has a small light-fastness to visible light and indirect light even when it is in the transitional state.

Light stabilizers and metallic luster pigments conventionally used are also less effective when the composition is in the color-developed state.

However, the use of the light-fastness providing agent used in the present invention is effective in all the cases.

The component-(b) electron accepting compound includes compounds having active protons, pseudo acid compounds (which are not acids, but compounds capable of acting as acids in the composition to make the component (a) form color), and compounds having electron holes.

Of the compounds having active protons, a compound having a phenolic hydroxyl group can exhibit the most effective thermochromic properties, and may be a compound selected from aromatic carboxylic acids, aliphatic carboxylic acids having 2 to 5 carbon atoms, carboxylic acid metal salts, acid phosphates and metal salts thereof, 1,2,3-triazole and derivatives thereof, thiourea and derivatives thereof, urea and derivatives thereof, guanidine and derivatives thereof, aromatic or aliphatic carboxylic acid anhydrides, borates, halogenated alcohols, oxazoles, thiazoles, imidazoles, pyrazoles, pyrroles, aromatic sulfonamides and aromatic sulfonimides.

The component-(d) light-fastness providing agent represented by Formula I is a compound having electron accepting properties in itself, and hence it is preferable to control the amount of the component-(b) electron accepting compound by the component-(d) light-fastness providing agent.

In place of the component (b), the component-(d) light-fastness providing agent may be used to serve also as the component (b).

The component-(a) electron donating, color forming organic compound used in the present invention are exemplified in Table 1.

TABLE 1

Compound groups, and exemplary compounds thereof

Diphenylmethanephthalides:

3,3-Bis(p-dimethylaminophenyl)-6-dimethylaminophthalide,
3,3-bis(p-dimethylaminophenyl)phthalide, etc.

Phenylindolylphthalides:

3-(4-Diethylaminophenyl)-3-(1-ethyl-2-methylindol-3-yl)phthalide,
3-(2-methyl-4-diethylamino)phenyl-3-[1-(2-methoxyethyl)-2-methylindol-3-yl]phthalide, etc.

Indolylphthalides:

3-3-Bis(1-n-butyl-2-methylindol-3-yl)phthalide,
3-3-bis(1-ethyl-2-methylindol-3-yl)phthalide,
3-3-bis(1-n-pentyl-2-methylindol-3-yl)phthalide,
3-(1-n-butyl-2-methylindol-3-yl)-3-(1-n-octyl-2-methylindol-3-yl)phthalide, etc.

Diphenylmethaneazaphthalides:

3,3-Bis(2-ethoxy-4-diethylaminophenyl)-4-azaphthalide,

Phenylindolylazaphthalides:

3-(2-Ethoxy-4-diethylaminophenyl)-3-(1-ethyl-2-methylindol-3-yl)-4-azaphthalide,
3-(4-diethylamino-2-methylphenyl)-3-(1-ethyl-2-methylindol-3-yl)-4-azaphthalide,
3-(2-ethoxy-4-N-ethylanilino)-3-(1-ethyl-2-methylindol-3-yl)-4-azaphthalide,
3-[2-ethoxy-4-(N-ethyl-4-n-butylphenylamino)phenyl]-3-(1-ethyl-2-methylindol-3-yl)-7-azaphthalide, etc.

Fluorans:

3,6-Dimethoxyfluoran1
3,6-di-n-butoxyfluoran,
2-chloro-6-diethylaminofluoran,
2-methyl-6-diethylaminofluoran,
2-methyl-6-(N-ethyl-N-p-tolylamino)fluoran,
3-chloro-6-cyclohexylaminofluoran,
2-methyl-6-cyclohexylaminofluoran,
2-anilino-6-(N-ethyl-N-n-hexylamino)fluoran,
2-(2-chloroanilino)-6-diethylaminofluoran,
2-(2-chloroanilino)-6-di-n-butylaminofluoran,
2-(3-trifluoromethylanilino)-6-diethylaminofluoran,
2-(N-cyclohexyl-N-benzylamino)-6-diethylaminofluoran,
2-N,N-dibenzylamino-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-chloro-3-methyl-6-(4-di-n-butylanilino)fluoran,
2-n-octylamino-3-methyl-6-diethylaminofluoran,
2-N,N-dibenzylamino-3-methyl-6-diethylaminofluoran,
2-N,N-dibenzylamino-4-methyl-6-diethylaminofluoran,
2-anilino-3-methyl-6-(N-methyl-N-n-propylamino)fluoran,
2-anilino-3-methyl-6-diethylaminofluoran,
2-amino-3-methyl-6-(N-ethyl-N-isobutylamino)fluoran,
2-anilino-3-methyl-6-di-n-butylaminofluoran,
2-anilino-3-methyl-6-(N-ethyl-N-isopentylamino)fluoran,
2-anilino-3-methyl-6-di-n-pentylaminofluoran,
2-anilino-3-methyl-6-(N-ethyl-N-cyclohexylamino)fluoran,
2-anilino-3-methyl-6-(N-ethyl-N-p-tolylamino)fluoran,
2-(2-fluoroanilino)-6-di-n-butylaminofluoran,
2-xylidino-3-methyl-6-diethylaminofluoran,
2-(p-n-butylanilino)-3-methyl-6-diethylaminofluoran,

TABLE 1-continued

Compound groups, and exemplary compounds thereof 1,2-benzo-6-diethylaminofluoran,
1,2-benzo-6-(N-ethyl-N-isobutylamino)fluoran,
1,2-benzo-6-(N-ethyl-N-isoamylamino)fluoran,
1,2-benzo-6-di-n-butylaminofluoran, etc., Styrylquinones:

2-(3-Methoxy-4-dodecoxystyryl)quinoline, etc.

Pyridines:

4-(4-N-methyl-N-benzylaminophenyl)pyridine,
2,6-diphenyl-4-(4-dimethylaminophenyl)pyridine,
2,6-bis(4-methoxyphenyl)-4-(4-dimethylaminophenyl)pyridine,
2,6-dimethyl-3,5-biscarboxyethoxy-4-(4-dimethylaminophenyl)pyridine,
2-(2-octoxyphenyl)-4-(4-dimethylaininophenyl)-6-phenylpyridine,
2,6-diethoxy-4-(4-diethylaminophenyl)pyridine,
2,6-bis(4-n-butoxyphenyl)-4-(4-dimethylaminophenyl)pyridine,
2,6-bis(2-n-butoxyphenyl)-4-(4-dimethylaminophenyl)pyridine,
2,6-bis(2-ethoxyphenyl)-4-(4-dimethylaminophenyl)pyridine,
2,6-bis(2-ethoxyphenyl)-4-(4-diethylaminophenyl)pyridine, etc.

Quinazolines:

2-(4-Dimethylaminophenyl)-4-methoxyquinazoline,
2-(4-dimethylaminophenyl)-4-phenoxyquinazoline,
2-(4-dimethylaminophenyl)-4-(4-nitrophenyloxy-quinazoline,
2-(4-N-methylanilinophenyl)-4-phenoxyquinazoline,
2-(4-piperidinophenyl)-4-phenoxyquinazoline,
2-(4-dimethylaminophenyl)-4-(4-chlorophenyloxy)quinazoline,
2-(4-dimethylaminophenyl)-4-(4-methoxyphenyloxy)quinazoline, etc.

Bisquinazolines:

4,4'-(Ethylenedioxy)-bis [2-(4-diethylaminophenyl)quinazoline],
4,4'-[propylenedioxy(1,3)])-bis[2-(4-diethylaminophenyl)quinazoline]
4,4'-[butylenedioxy(1,3)])-bis[2-(4-diethylaminophenyl)quinazoline],
4,4'-[butylenedioxy(1,4)])-bis[2-(4-diethylaminophenyl)quinazoline],
4,4'-(oxydiethylenedioxy)-bis [2-(4-diethylaminophenyl)quinazoline],
4,4'-(ethylenedioxy)-bis[2-(4-piperidinophenyl)quinazoline],
4,4'-(ethylenedioxy)-bis [2-(4-di-n-propylaminophenyl)quinazoline],
4,4'-(ethylenedioxy)-bis [2-(4-di-n-butylaminophenyl)quinazoline],
4,4'(cyclohexylenedioxy)-bis [2-(4-diethylaminophenyl)quinazoline], etc.

Ethylenophthalides:

3-3-Bis[1,1-bis-(p-dimethylaminophenyl)ethyleno-2]phthalide,
3-3-bis[1,1-bis-(2-methyl-4-dimethylaminophenyl)ethyleno-2]phthalide,
3-3-bis[1,1-bis-(p-dimethylaminophenyl)ethyleno-2]-4,5,6,7-tetrachlorophthalide, etc.

Ethylenoazaphthalides:

3-3-Bis[1,1-bis-(p-dimethylaminophenyl)ethyleno-2]-4-azaphthalide,
3-3-bis[1,1-bis-(p-dimethylaminophenyl)ethyleno-2]-4,7-diazaphthalide,
3-(p-dimethylaminophenyl)-3-[1,1-bis-(p-dimethylaminophenyl)ethyleno-2]-4-azaphthalide,
etc.

TABLE 1-continued

Compound groups, and exemplary compounds thereof

Fluorenes:

3,6-Bis(dimethylamino)fluorenespiro(9.3')-6'-dimethylaminophthalide,
3,6-bis(diethylamino)fluorenespiro(9.3')-4'-azaphthalide,
3,6-bis(diethylamino)fluorenespiro(9.3')-7'-azaphthalide,
3,6-bis(diethylamino)fluorenespiro(9.3')-4',7'-diazaphthalide, etc The component-(b) electron accepting compound used in the present invention are exemplified in Table 2 below.

Compound groups, and exemplary compounds thereof

Compounds having phenolic hydroxyl groups:
(Including monophenols to polyphenols; those having as a substituent thereof an alkyl group, an aryl group, an acyl group, an alkoxycarbonyl group, a carboxyl group, esters thereof, or an amide group or a halogen atom; bis-type or tris-type phenols; and phenol-aldehyde condensation resins. They may also be metals salts of these compounds having phenolic hydroxyl groups.)

Phenol, o-cresol, tertiary butyl catechol, 3-isopropyl catechol, p-chlorophenol, p-bromophenol, o-phenylphenol,
methyl p-hydroxybenzoate,
ethyl p-hydroxybenzoate,
propyl p-hydroxybenzoate,
n-butyl p-hydroxybenzoate,
resorsinol, α-naphthol, β-naphthol,
1,2-dioxynaphthalene,
2,3-dioxynaphthalene,
hydroquinone monomethyl ether,
guaiacol, eugenol,
methyl protocatechuate, ethyl protocatechuate,
propyl protocatechuate,
methyl gallate, ethyl gallate, butyl gallate,
tannic acid,
4,4'-methylene bisphenol,
bis-(3-methyl-4-hydroxyphenyl)-methane,
1,1-bis-(4-hydroxyphenyl)-ethane,
1,1-bis-(4-hydroxyphenyl)-propane,
1,1-bis-(3-methyl-4-hydroxyphenyl)-propane,
1,1-bis-(3-isopropyl-4-hydroxyphenyl)-propane,
1,1-bis-(4-hydroxyphenyl)-butane,
1,1-bis-(4-hydroxyphenyl)-2-methylpropane,
2,2-bis-(4-hydroxyphenyl)-propane,
2,2-bis-(3-methyl-4-hydroxyphenyl)-propane,
2,2-bis-(4-hydroxyphenyl)-butane,
4,4',4"-methylidenetrisphenol,
4,4-dihydroxydiphenyl sulfone,
4-isopropoxy-4'-hydroxydiphenyl sulfone,
bis(4-hydroxydiphenyl) sulfide, phenol resin, etc.
Metal salts:

Metal salts of metals such as sodium, potassium, lithium, calcium, zinc, zirconium, aluminum, magnesium, nickel, cobalt, tin, copper, iron, vanadium, titanium, lead and molybdenum.
Aromatic carboxylic acids, and aliphatic carboxylic acids having 2 to 5 carbon atoms:

Maleic acid, fumaric acid, benzoic acid, toluic acid, p-tert-butylbenzoic acid, chlorobenzoic acid, bromobenzoic acid, ethoxybenzoic acid, gallic acid, naphthoic acid, phthalic acid, naphthalene dicarboxylic acid, acetic acid, propionic acid, butyric acid, valeric acid, etc.
Carboxylic acid metal salts:

Metals salts of metals such as sodium, potassium, lithium, calcium, zinc, zirconium, aluminum, magnesium, nickel, cobalt, tin, copper, iron, vanadium, titanium, lead and molybdenum, of acetic acid, propionic acid, butyric acid, caproic acid, caprylic acid, capric acid, lauric acid; myristic acid, palmitic acid, stearic acid, isostearic acid, behenic acid, crotonic acid, oleic acid, elaidic acid, linolic acid, linolenic acid, monochloroacetic acid, monobromoacetic acid, monofluorooacetic acid, glycolic acid, hydroxypropionic acid, hydroxybutyric acid, ricinolic acid, 1,2-hydroxystearic acid, lactic acid, pyruvic acid, oxalic acid, malonic acid, succinic acid, adipic acid, sebacic acid, malic acid, tartaric acid, valeric acid, maleic acid, fumaric acid, naphthenic acid, benzoic acid, toluic acid, phenylacetic acid, p-tert-butylbenzoic acid, cinnamic acid, chlorobenzoic acid, bromobenzoic acid, ethoxybenzoic acid, mandelic acid, protocatechuic acid, vanilic acid, resorcic acid, dioxybenzoic acid, dioxychlorobenzoic acid, gallic acid, naphthoic acid, hydroxynaphthoic acid, phthalic acid, monoethyl phthalate, naphthalene dicarboxylic acid, naphthalene monomethyldicarboxylic acid, trimellitic acid, pyromellitic acid, etc.
Acid phosphates:
(Acid phosphate compounds include monoesters and diestrers, and may be mixtures thereof. Mixtures of monoesters and diestrers are called acid phosphates.)

n-Butyl acid phosphate,
n-ethylhexyl acid phosphate,
n-octyl acid phosphate,
oleyl acid phosphate,
2-chloroethyl acid phosphate,
cyclohexyl acid phosphate,
phenyl acid phosphate,
diethyl phosphate,
phenyl methyl phosphate,
cyclohexylstearyl phosphate,
dibenzyl phosphate, etc.
Metal salts of acid phosphates:

Metals salts of metals such as sodium, potassium, lithium, calcium, zinc, zirconium, aluminum, magnesium, nickel, cobalt, tin, copper, iron, vanadium, titanium, lead and molybdenum, of the above compounds.
Triazole compounds:

1,2,3-Triazole,
1,2,3-benzotriazole,
5-chloro-1,2,3-benzotriazole, etc.
Thiourea and derivatives thereof:

Thiourea, ethylthiourea, N,N-diethylthiourea, 1-phenylthiourea, diphenyl-bis-thiourea, etc.
Urea and derivatives thereof:

Urea, 1,3-diphenylurea, benzylurea, N,N-dichlorohexylurea, etc.
Guanidine and derivatives thereof:

Guanidine, 1,3-diphenylguanidine, etc.
Aromatic and aliphatic carboxylic acid anhydrides:

Phthalic anhydride, benzoic anhydride, acetic anhydride, succinic anhydride, maleic anhydride, etc.
Borates:

Triphenyl borate, tri-n-octyl borate, etc.
Halogenated alcohols:

2,2,2-Trichloroethanol,
1,1,1-tribromo-2-propanol, etc.

-continued

| Compound groups, and exemplary compounds thereof |
|---|
| Oxazoles:<br><br>2-Mercaptobenzoxazole, 2-hydroxybenzoxazole, etc.<br>Thiazoles:<br><br>Benzothiazole, 2-mercaptobenzothiazole, etc.<br>Imidazoles:<br><br>Imidazole, benzoimidazole, etc.<br>Pyrazoles:<br><br>Pyrazole, benzopyrazole, etc.<br>Pyrroles:<br><br>Pyrrole, benzopyrrole, etc.<br>Aromatic sulfonamides:<br><br>Benzenesulfonamide, benzenesulfonanilide, etc<br>Aromatic sulfonimides:<br><br>D-sulfobenzimide,<br>1,2-cyclohexanesulfocarboxyimide, etc. |

The component-(c) metachromatic temperature adjuster used in the present invention are exemplified in Table 3 below.

TABLE 3

| Compound groups, and exemplary compounds thereof |
|---|
| Alcohols:<br>(Aliphatic monohydric saturated alcohols having 10 or more carbon atoms) |

Decyl alcohol, undecyl alcohol, dodecyl alcohol, tridecyl alcohol, tetradecyl alcohol (Example: myristyl alcohol), pentadecyl alcohol, hexadecyl alcohol, heptadecyl alcohol, octadecyl alcohol (Example: stearyl alcohol), eicosyl alcohol, docosyl alcohol, etc.

| Esters 1:<br>(Esters having 10 or more carbon atoms are effective, including esters obtained from any desired combination of monobasic carboxylic acids having an aliphatic or alicyclic ring or an aromatic ring with monohydric alcohols having an aliphatic or alicyclic ring or an aromatic ring; esters obtained from any desired combination of polybasic carboxylic acids having an aliphatic or alicyclic ring or an aromatic ring with monohydric alcohols having an aliphatic or alicyclic ring or an aromatic ring; and esters obtained from any desired combination of monobasic carboxylic acids having an aliphatic or alicyclic ring or an aromatic ring with polyhydric alcohols having an aliphatic or alicyclic ring or an aromatic ring.) |
|---|

Ethyl caprylate, octyl caprylate, stearyl caprylate,
myristyl caprate, docosyl caprate, cetyl caprate, stearyl caprate,
2-ethylhexyl laurate, n-decyl laurate,
3-methylbutyl myristate, cetyl myristate, stearyl myristate,
isopropyl palmitate, neopentyl palmitate, nonyl palmitate, stearyl palmitate, cyclohexyl palmitate,
n-butyl stearate, n-methylbutyl stearate, 3,5,5-trimethylhexyl stearate, n-undecyl stearate, pentadecyl stearate, stearyl stearate, cyclohexylmethyl stearate,
isopropyl behenate, hexyl behenate, lauryl behenate, behenyl behenate,
cetyl benzoate, stearyl p-tert-butyl benzoate, dimyristyl phthalate, distearyl phthalate, dimyristyl oxalate, dicetyl oxalate,

TABLE 3-continued

| Compound groups, and exemplary compounds thereof |
|---| dicetyl malonate, dilauryl succinate, dilauryl glutarate, diundecyl adipate, dilauryl azelate, di-(n-nonyl) sebacate,
dineopentyl 1,18-octadecylmethylenedicarboxylate,
ethylene glycol dimyristate,
propylene glycol dillaurate,
propylene glycol distearate,
hexylene glycol palmitate,
1,5-pentanediol distearate,
1,2,6-hexanetriol trimyristate,
1,4-cyclohexanediol didecyl,
1,4-cyclohexanedimethanol dimyristate,
xylene glycol dicaprinate,
xylene glycol distearate, etc.

| Esters 2:<br>(Esters of saturated fatty acids with branched aliphatic alcohols, and esters of unsaturated fatty acids or saturated fatty acids having a branch or substituent with aliphatic alcohols branched or having 16 or more carbon atoms are also effective.) |
|---|

2-Ethylhexyl butyrate,
2-methylbutyl caproate, 1-ethylpentyl caproate, 2-methylpentyl caproate,
2-methylbutyl caprylate, 2-methylpentyl caprylate,
2-methylbutyl caprate, 2-ethylhexyl caprate, 1-methylpentyl caprate, 2-methylpentyl caprate,
1,1-dimethylpropyl laurate, 2-methylpentyl laurate, 1-ethylhexyl laurate, 3,5,5-trimethylhexyl laurate, 3,7-dimethyloctyl laurate,
1-ethylhexyl myristate, 2-ethylhexyl myristate, 3,7-dimethylhexyloctyl myristate,
1-ethylpropyl palmitate, 1-ethylpentyl palmitate, 2-methylhexyl palmitate, 1-ethylhexyl palmitate, 3,5,5-trimethylhexyl palmitate, 3,7-dimethyloctyl palmitate
1-methylpropyl stearate, 1-ethylpropyl stearate, 2-methylbutyl stearate, 3-methylbutyl stearate, neopentyl stearate, 1-methylhexyl stearate, 2-methylhexyl stearate, 3,5,5-trimethylhexyl stearate, 1-methylheptyl stearate, 1-methyloctyl stearate, 3,7-dimethyloctyl stearate,
1-ethylpropyl behenate, 2-methylbutyl behenate, 3-methylbutyl behenate, 2-methylhexyl behenate, 2-ethylhexyl behenate, 1-methylheptyl behenate, 3,7-dimethyloctyl behenate,
stearyl oleate, behenyl oleate,
stearyl linolate, behenyl linolate,
3,7-dimethyloctyl erucate, stearyl erucate, isostearyl erucate,
cetyl isostearate, stearyl isostearate,
2-methylpentyl 12-hydroxycisstearate,
2-ethylhexyl 18-bromostearate,
isostearyl 2-ketomyristate,
2-ethylhexyl 2-fluoromyristate, etc.

| Esters 3:<br>[Of the foregoing esters, the use of esters having a ΔT value (melting point - claud point) of 3° C. or below as disclosed in Japanese Patent Publication No. 1-2398 makes it possible to show small hysteresis characteristics (hysteresis width: 0.5 to 2.0° C.) in regard to the color density-temperature curve and to exhibit thermochromic properties responsive in a high sensitivity.<br>The esters having the width of ΔT of 3° C. or below include alkyl esters, aryl esters, arylalkyl esters, alicyclic esters, branched alkyl esters of aromatic or aliphatic carboxylic acids, and substituted derivatives thereof.] |
|---|

Cetyl butyrate, stearyl butyrate, behenyl butyrate,
2-methylbutyl caproate, 2-methylpentyl caproate, 1-ethylpentyl caproate,
2-methylbutyl caprylate, 2-methylpentyl caprylate,
2-methylbutyl caprate, 1-methylpentyl caprate, 2-methylpentyl caprate, 2-ethylhexyl caprate,

TABLE 3-continued

Compound groups, and exemplary compounds thereof 1,1-dimethylpropyl laurate, 2-methylpentyl
laurate, 1-ethylhexyl laurate, 3,5,5-
trimethylhexyl laurate, 3,7-dimethyloctyl laurate,
1-ethylhexyl myristate, 2-ethylhexyl myristate,
3,5,5-trimethylhexyl myristate, 3,7-dimethyloctyl
myristate,
n-butyl palmitate, 1-ethylpropyl palmitate, 1-
ethylpebtyl palmitate, 1-ethylhexyl palmitate,
3,5,5-trimethylhexyl palmitate, 3,7-dimethyloctyl
palmitate,
1-methylpropyl stearate, 1-ethylpebtyl stearate, n-
butyl stearate, 3-methylbutyl stearate, n-hexyl
stearate, 1-methylhexyl stearate, 2-methylhexyl
stearate, 1-methylheptyl stearate, 1-methyloctyl
stearate, 3,7-dimethyloctyl stearate, lauryl
stearate,
n-butyl arachate,
n-butyl behenate, 1-ethylpropyl behenate, 3-
methylbutyl behenate, 2-methylhexyl behenate, 2-
ethylhexyl behenate, 1-methylheptyl behenate, 3,7-
dimethyloctyl behenate,
n-butyl erucate, 3,7-dimethyloctyl erucate,
isostearyl erucate,
stearyl isostearate, cetyl isostearate,
2-methylpentyl 12-hydroxystearate,
2-ethylhexyl 18-bromostearate,
isostearyl 2-ketomyristate,
2-ethylhexyl 2-fluoromyristate,
stearyl oleate, behenyl oleate,
stearyl linorate, behenyl linorate, etc.
Esters 4:
[Esters having a ΔT value (melting point - claud point)
of 5° C. or above to less than 50° C. as disclosed in
Japanese Patent Publication No. 4-17154 are effective
in order to impart color-memorizing thermochromic
properties, depending on temperature changes, where
metachromatism occurs while exhibiting large hysteresis
characteristics (the shapes of the curves formed by
plotting changes in coloring density caused by changes
in temperature are different between the case when
temperatures are changed from the low-temperature side
to the high-temperature side with respect to the
metachromatic temperature range and the case when they
are vice versa, and shows the shape of a loop when both
the curves are combined) in regard to the color density-
temperature curve].

- Compound Group (1) -
Carboxylates containing a substituted aromatic group in
the molecule:

Stearyl 2-methyl benzoate,
cetyl 4-tert-butyl benzoate,
behenyl 4-cyclohexyl benzoate,
myristyl 4-phenyl benzoate,
lauryl 4-octyl benzoate,
hexyl 3,5-dimethyl benzoate,
stearyl 3-ethyl benzoate,
decyl 4-isopropyl benzoate,
stearyl 4-benzoyl benzoate,
phenyl 4-tert-butyl benzoate,
4-chlorobenzyl 2-methyl benzoate,
stearyl 4-chlorobenzoate,
myristyl 3-bromobenzoate,
stearyl 2-chloro-4-bromobenzoate,
decyl 3,4-dichlorobenzoate,
octyl 2,4-dibromobenzoate,
cetyl 3-nitrobenzoate,
cyclohexylmethyl 4-aminobenzoate,
cetyl 4-diethylaminobenzoate,
stearyl 4-anilinobenzoate,
decyl 4-methoxybenzoate,
cetyl 4-methoxybenzoate,
octyl 4-butoxybenzoate,
cetyl 4-hydroxybenzoate,
4-methoxyphenylmethyl benzoate,
stearyl p-chlorophenyl acetate,
cetyl p-chlorophenyl acetate,
benzyl salicylate,
neopentyl salicylate,
4-methoxymethylphenymethyl salicylate,
4-chlorophenylmethyl benzoate,
4-chlorophenylmethyl caprate,
4-methoxyphenylmethyl myristate,
4-methylphenylmethyl stearate,
4-nitrophenylmethyl stearate,
4-methylphenylmethyl caproate,
4-chlorophenylmethyl myristate,
4-methylphenylmethyl caprate,
4-chlorophenylmethyl 11-bromolaurate,
4-isopropylphenyl stearate, etc.
- Compound Group (2) -
Esters of carboxylic acids containing an unsubstituted
aromatic group with aliphatic alcohols having 10 or
more carbon atoms:

Stearyl 1-naphthoate,
cetyl benzilate,
stearyl benzilate,
decyl 3-benzoyl propionate,
stearyl benzoate,
cetyl benzoate,
myristyl benzoate, etc.
- Compound Group (3) -
Carboxylates containing a cycloalkyl group in the
molecule:

Cyclohexylmethyl cinnamate,
cyclohexyl laurate,
cyclohexyl myristate,
cyciohexyl palmitate,
cyclohexylmethyl stearate,
cyclohexylethyl stearate,
stearyl cyclohexylethyl acetate,
stearyl 2-cyclohexyl propionate,
stearyl 2-cyclohexane carboxylate,
cyclohexyl 2-penzoyl propionate, etc.
- Compound Group (4) -
Esters of fatty acids having 6 or more carbon atoms
with unsubstituted aromatic alcohols or phenols:

Benzyl caproate,
benzyl palmitate,
3-phenylpropyl stearate,
phenyl 11-bromolaurate, etc.
- Compound Group (5) -
Esters of fatty acids having 8 or more carbon atoms
with branched aliphatic alcohols:

Neopentyl octylate,
neopentyl laurate, etc.
- Compound Group (6) -
Diesters of carboxylic acids with aromatic alcohols or
branched aliphatic alcohols:

Dibenzyl sebacate,
dineopentyl 4,4'-diphenyl carboxylate,
dibenzyl azodicarboxylate, etc.
- Compound Group (7) -
Other compounds:

Benzyl cinnamate, heptyl stearate, didecyl
adipate, dilauryl adipate, dimyristyl adipate,
dicetyl adipate, distearyl adipate, trilaurin,
trimyristin, tristearin, dimyristin, distearin,
etc.
Esters 5:
(Fatty acid ester compounds obtained from aliphatic
monohydric alcohols having 9 or more odd-numbered
carbon atoms and aliphatic carboxylic acids having even-
numbered carbon atoms, and fatty acid ester compounds
having 17 to 23 carbon atoms in total, obtained from n-
pentyl alcohol or n-heptyl alcohol and aliphatic

TABLE 3-continued

Compound groups, and exemplary compounds thereof carboxylic acids having 10 to 16 even-numbered carbon atoms are also effective.)

n-Pentadecyl acetate,
n-tridecyl butyrate, n-pentadecyl butyrate,
n-undecyl caproate, n-tridecyl caproate, n-pentadecyl caproate,
n-nonyl caprylate, n-undecyl caprylate, n-tridecyl caprylate, n-pentadecyl caprylate,
n-heptyl caprate, n-nonyl caprate, n-undecyl caprate, n-tridecyl caprate, n-pentadecyl caprate,
n-pentyl laurate, n-heptyl laurate, n-nonyl laurate, n-undecyl laurate, n-tridecyl laurate, n-pentadecyl laurate,
n-pentyl myristate, n-heptyl myristate, n-nonyl myristate, n-undecyl myristate, n-tridecyl myristate, n-pentadecyl myristate,
n-pentyl palmitate, n-heptyl palmitate, n-nonyl palmitate, n-undecyl palmitate, n-tridecyl palmitate, n-pentadecyl palmitate,
n-nonyl stearate, n-undecyl stearate, n-tridecyl stearate, n-pentadecyl stearate,
n-nonyl eicosanate, n-undecyl eicosanate, n-tridecyl eicosanate, n-pentadecyl eicosanate,
n-nonyl behenate, n-undecyl behenate, n-tridecyl behenate, n-pentadecyl behenate, etc.
Ketones:
(Aliphatic ketones having 10 or more carbon atoms in total)

2-Decanone, 3-decanone, 4-decanone,
2-undecanone, 3-undecanone, 4-undecanone, 5-undecanone,
2-dodecanone, 3-dodecanone, 4-dodecanone, 5-dodecanone,
2-tridecanone, 3-tridecanone,
2-tetradecanone,
2-pentadecanone, 8-pentadecanone,
2-hexadecanone, 3-hexadecanone,
9-heptadecanone, 2-pentadecanone, 2-octadecanone,
2-nonadecanone, 10-nonadecanone,
2-eicosanone, 11-eicosanone,
heneicosanone, 2-docosanone,
laurone, stearone, etc.
Ethers:
(Aliphatic ethers having 10 or more carbon atoms in total)

Dipentyl ether, dihexyl ether, diheptyl ether,
dioctyl ether, dinonyl ether, didecyl ether,
diundecyl ether, didodecyl ether, ditridecyl ether, ditetradecyl ether, dipentadecyl ether,
dihexadecyl ether, dioctadecyl ether,
decanediol dimethyl ether, undecanediol dimethyl ether, dodecandiol dimethyl ether, tridecanediol dimethyl ether,
decanediol diethyl ether, undecanediol diethyl ether, etc.

The component-(d) light-fastness providing agent used in the present invention are exemplified in Table 4 below.

TABLE 4

Compound groups, and exemplary compounds thereof

1. Compounds having no substituent in the aromatic ring:

1,1-Bis(4-hydroxyphenyl)-n-hexane,
1,1-bis(4-hydroxyphenyl)-2-ethylbutane,
1,1-bis(4-hydroxyphenyl)-2-methylpentane,
1,1-bis(4-hydroxyphenyl)-n-octane,
1,1-bis(4-hydroxyphenyl)-2,3-dimethylpentane,
1,1-bis(4-hydroxyphenyl)-n-octane,
1,1-bis(4-hydroxyphenyl)-2-ethylhexane,

TABLE 4-continued

Compound groups, and exemplary compounds thereof 1,1-bis(4-hydroxyphenyl)-n-nonane,
1,1-bis(4-hydroxyphenyl)-n-decane,
1,1-bis(4-hydroxyphenyl)-3,7-dimethyloctane,
1,1-bis(4-hydroxyphenyl)-n-undecane,
1,1-bis(4-hydroxyphenyl)-n-dodecane,
1,1-bis(4-hydroxyphenyl)-n-tridecane,
1,1-bis(4-hydroxyphenyl)-n-tetradecane,
1,1-bis(4-hydroxyphenyl)-n-pentadecane,
1,1-bis(4-hydroxyphenyl)-n-hexadecane,
1,1-bis(4-hydroxyphenyl)-n-heptadecane,
1,1-bis(4-hydroxyphenyl)-n-octadecane,
2. Compounds having one substituent in the aromatic ring:

1,1-Bis(3-methyl-4-hydroxyphenyl)-n-hexane,
1,1-bis(3-methyl-4-hydroxyphenyl)-2-ethylbutane,
1,1-bis(3-methyl-4-hydroxyphenyl)-2-methylpentane,
1,1-bis(3-methyl-4-hydroxyphenyl)-n-octane,
1,1-bis(3-methyl-4-hydroxyphenyl)-2-ethylhexane,
1,1-bis(3-methyl-4-hydroxyphenyl)-n-decane,
1,1-bis(3-methyl-4-hydroxyphenyl)-3,7-dimethyloctane,
1,1-bis(3-methyl-4-hydroxyphenyl)-n-dodecane,
1,1-bis(3-methyl-4-hydroxyphenyl)-n-tetradecane,
1,1-bis(3-methyl-4-hydroxyphenyl)-n-hexadecane,
1,1-bis(3-methyl-4-hydroxyphenyl)-n-octadecane,
1,1-bis(3-ethyl-4-hydroxyphenyl)-n-decane,
1,1-bis(3-n-propyl-4-hydroxyphenyl)-n-decane,
1,1-bis(3-isopropyl-4-hydroxyphenyl)-n-decane,
1,1-bis(3-n-butyl-4-hydroxyphenyl)-n-decane,
1,1-bis(3-sec-butyl-4-hydroxyphenyl)-n-decane,
1,1-bis(3-isobutyl-4-hydroxyphenyl)-n-decane,
1,1-bis(3-tert-butyl-4-hydroxyphenyl)-n-decane,
1,1-bis(3-fluoro-4-hydroxyphenyl)-n-decane,
1,1-bis(3-chloro-4-hydroxyphenyl)-n-decane,
1,1-bis(3-bromo-4-hydroxyphenyl)-n-decane,
1,1-bis(3-iodo-4-hydroxyphenyl)-n-decane,
1,1-bis(2-methyl-4-hydroxyphenyl)-n-decane,
1,1-bis(2-ethyl-4-hydroxyphenyl)-n-decane,
1,1-bis(2-chloro-4-hydroxyphenyl)-n-decane,
1,1-bis(2-bromo-4-hydroxyphenyl)-n-decane, etc
3. Compounds having two substituents in the aromatic ring:

1,1-Bis(2,3-dimethyl-4-hydroxyphenyl)-n-decane,
1,1-bis(2-methyl-4-hydroxy-5-tert-butylphenyl)-n-decane,
1,1-bis(2,6-dimethyl-4-hydroxyphenyl)-n-decane,
1,1-bis(3,5-dimethyl-4-hydroxyphenyl)-n-decane,
1,1-bis(3,5-di-sec-butyl-4-hydroxyphenyl)-n-decane,
1,1-bis(3,5-di-tert-butyl-4-hydroxyphenyl)-n-decane, etc.
4. Compounds having three substituents in the aromatic ring:

1,1-Bis(2,3,5-trimethyl-4-hydroxyphenyl)-n-decane,
1,1-bis(2,3,6-trimethyl-4-hydroxyphenyl)-n-decane,
etc.

The reversible thermochromic composition according to the present invention is applied to a substrate in the state the components (a) to (d) are dispersed in a resin binder.

As the substrate, paper, cloth, metallic products, synthetic resin products, ceramic products, concrete products and so forth.

The components (a) to (d) may preferably be enclosed in microcapsules when used to prepare the composition. The components (a) to (d), thus enclosed in microcapsules, can be mixed in the resin binder in the state all the components are surely present and hence a homogeneous composition can be formed, bringing about stable effects.

EXAMPLES

The present invention will be described below in greater detail by giving Examples. Examples for producing the reversible thermochromic composition will be given first as Production Examples.

Production Example 1

Four components comprised of 1.0 part by weight of 3-(N-isobutyl-N-ethylamino)-7,8-benzofluoran, 4.0 parts by weight of 4,4'-methylenebisphenol, 50.0 parts by weight of stearyl alcohol and 2.0 parts by weight of 1,1-bis(4'-hydroxyphenyl)-n-decane were heated and dissolved at 120° C. to form a homogeneous mixture (mutual solution), which was then mixed in a mixture solution of 10 parts by weight of EPON (trade name; an epoxy resin available from Yuka Shell Epoxy Kabushikikaisha). Thereafter, the mixture obtained was dropwise added to 100 parts by weight of an aqueous 10% gelatin solution, followed by stirring so as to form minute droplets. A solution separately prepared by dissolving 5 parts by weight of a curing agent EPICURE U (trade name; an amine adduct of epoxy resin available from Yuka Shell Epoxy Kabushikikaisha) in 45 parts by weight of water was added little by little in the above solution being stirred. While keeping the liquid temperature at 80° C., the stirring was continued for about 5 hours to obtain a microcapsular material solution. This material solution was centrifuged to obtain a reversible thermochromic composition, Composition No. 1, capable of varying in color between pink and colorless, having a water content of about 40% by weight.

Production Examples 2 to 90

The procedure of Production Example 1 was repeated to obtain reversible thermochromic compositions, Compositions Nos. 2 to 90, except that the combination of the components (a) to (d) were changed.

Composition and color variation (metachromatism) of these reversible thermochromic compositions Nos. 1 to 90 are shown in Tables 5 to 18.

Compositions Nos. 1 to 71 are compositions used in the present invention, in which the component-(d) light-fastness providing agent is mixed. Compositions Nos. 72 to 90 are compositions for comparison in which the component-(d) light-fastness providing agent is not mixed.

In Tables 5 to 18, mixing proportions are indicated as part(s) by weight.

(Tables 5 to 18)

Using the reversible thermochromic compositions as shown in Tables 5 to 18, light-fastness tests were made in the following was as Examples 1 to 132 and Comparative Examples 1 to 32 to compare their properties.

Preparation of light-fastness test samples:

To make the tests as Examples 1 to 61 and Comparative Examples 1 to 32 each, 10 parts by weight of the reversible thermochromic composition, 45 parts by weight of a xylene solution of acrylic resin (resin solid matter: 50%), 20 parts by weight of xylene and 20 parts by weight of methyl isobutyl ketone were uniformly mixed with stirring, and the mixture obtained was spray-coated on a white vinyl chloride sheet by means of a spray gun to provide thereon a reversible thermochromic layer of about 40 μm thick. The spray-coated products thus obtained were used as light-fastness test samples.

Light-fastness test methods:

As a light-fastness test method, light-fastness against xenon arc lamp light was tested.

The xenon arc lamp light-fastness test was made according to the standard prescribed in JIS L-0843 (a test method for color fastness to xenon arc lamp), using SUNTEST CPU, manufactured by Heraus Co. With regard to exposure time, test samples having different exposure time were obtained at three points of 10 hour exposure, 20 hour exposure and 30 hour exposure.

As another light-fastness test method, light-fastness against north-side in door indirect light was tested. With regard to test days, test samples having different exposure days were obtained at five points of after 14 days, after 28 days, after 42 days, after 56 days and after 70 days.

The light-fastness was evaluated as coloring density retention determined in the following way: Each ample tested for the stated time in the xenon arc lamp light-fastness test and north-side in door indirect light-fastness test and a control (unexposed sample) were examined using a color difference meter (manufactured by Tokyo Denshoku K. K.) to measure a stimulus value (X value) of the density at the time of coloring of the sample.

The coloring density retention was calculated according the following expression:

Coloring density retention (%) =

$$\frac{100 - \text{stimulus value } (X) \text{ after exposure}}{100 - \text{stimulus value } (X) \text{ before exposure}} \times 100$$

Results obtained are shown in Tables 19 to 30. As is seen from the test results shown in Tables 19 to 30, the present invention brings about an improvement in light-fastness of the reversible thermochromic composition at the time of color development.

Examples 1 to 61 and Comparative Examples 1 to 13 concerns the light-fastness tests made under xenon arc lamp light (i.e., "Xenotest"); and Examples 62 to 132 and Comparative Examples 14 to 32, the tests on light-fastness against north-side in door indirect light (i.e., "northlight test"). As is seen from the rapid decrease in coloring density in Comparative Examples, the present invention is effective.

(Tables 19 to 30)

The light-fastness improvement effect attributable to the present invention is also graphically shown in the accompanying drawings, FIGS. 1 to 40, as attenuation of coloring density in the test made using xenon arc lamp light (the Xenotest) and in the test made under north-side in door indirect light (the northlight test).

FIGS. 1 to 17 are graphical representations of the attenuation of coloring density in the Xenotest.

With regard to FIGS. 3, 4 and 12 to 17, the test was made using the tester at an in-machine temperature of 20° C., and with regard to the other Figures, at 40° C.

FIGS. 1 to 17 show the test results obtained in Examples 1 to 61 shown in Tables 19 to 22 and the test results obtained in Comparative Examples 1 to 13 shown in Table 28.

Straight lines in FIG. 1 indicate the results of Examples 5, 4, 3, 2 and 1 in this order from the top, and the line at the lowest part, Comparative Example 1. As is seen from FIG. 1, the reversible thermochromic compositions according to the present invention exhibit a very good light-fastness at the time of color development.

Figure 2:
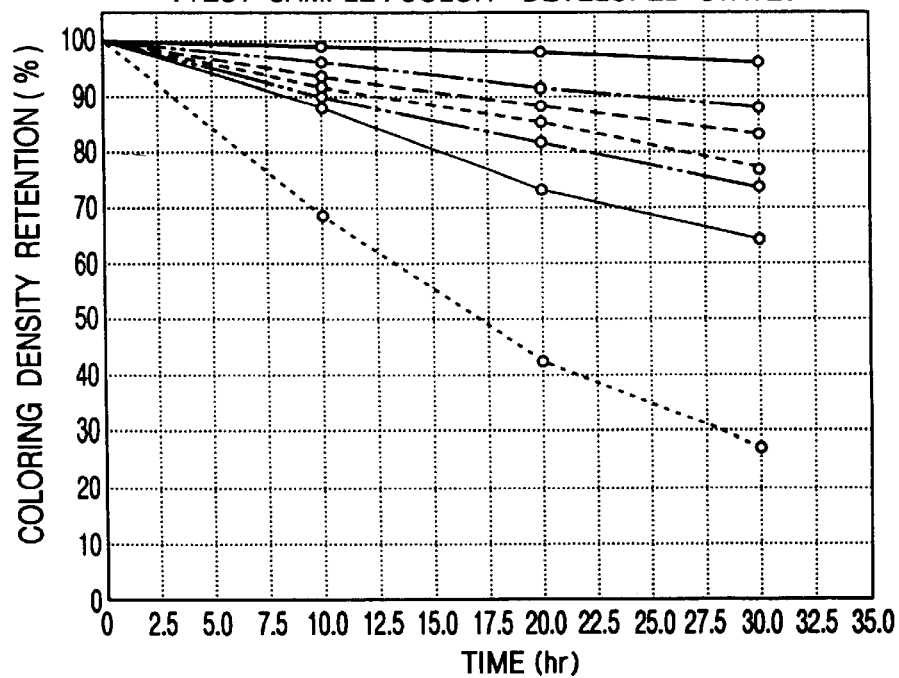

Straight lines in FIG. 2 indicate the results of Examples 11, 10, 9, 8, 7 and 6 in this order from the top, and the line at the lowest part, Comparative Example 2. As is seen from FIG. 2, the reversible thermochromic compositions according to the present invention exhibit a very good light-fastness at the time of color development.

Figure 3:
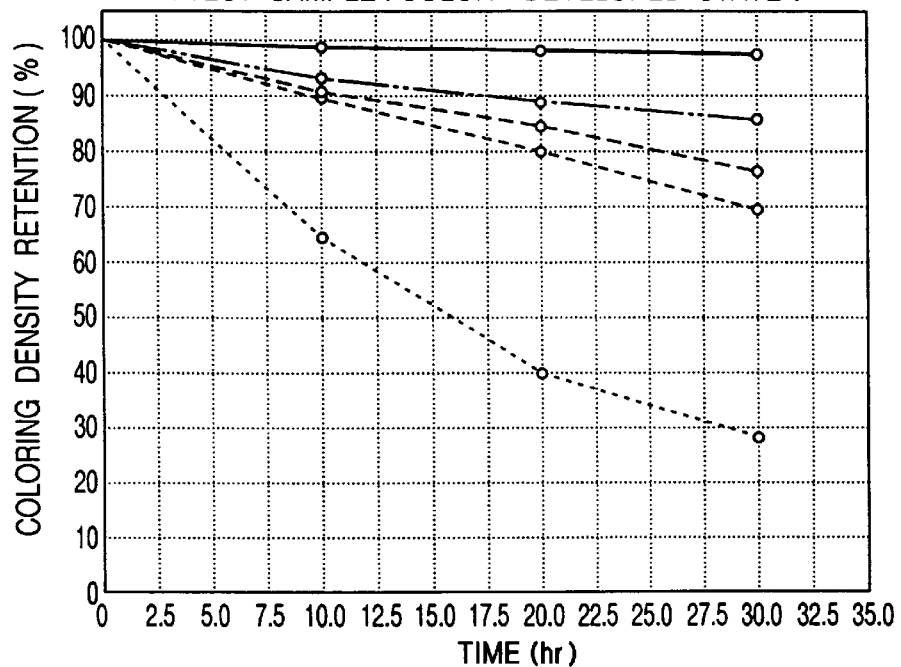

Straight lines in FIG. 3 indicate the results of Examples 15, 14, 13 and 12 in this order from the top, and the line at the lowest part, Comparative Example 3. As is seen from FIG. 3, the reversible thermochromic compositions according to the present invention exhibit a very good light-fastness at the time of color development.

Figure 4:
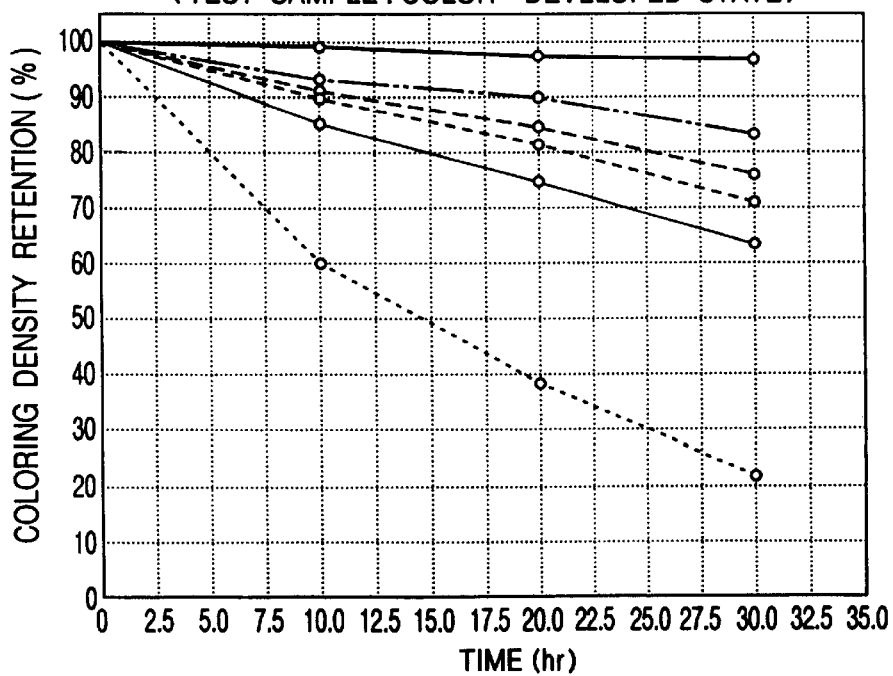

Straight lines in FIG. 4 indicate the results of Examples 20, 19, 18, 17 and 16 in this order from the top, and the line at the lowest part, Comparative Example 4. As is seen from FIG. 4, the reversible thermochromic compositions according to the present invention exhibit a very good light-fastness at the time of color development.

Figure 5:
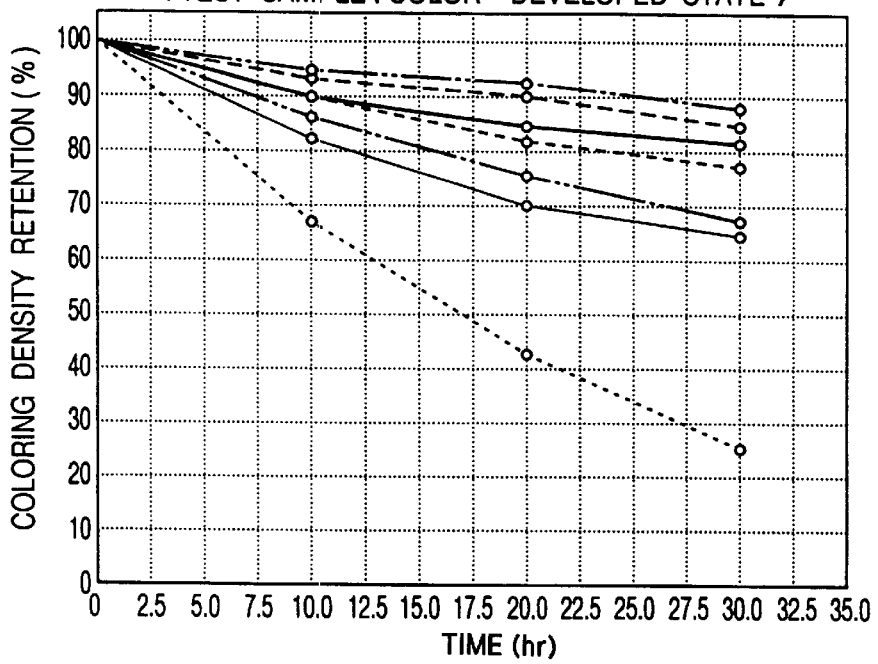

Straight lines in FIG. 5 indicate the results of Examples 25, 24, 26, 23, 22 and 21 in this order from the top, and the line at the lowest part, Comparative Example 5. As is seen from FIG. 5, the reversible thermochromic compositions according to the present invention exhibit a very good light-fastness at the time of color development.

Figure 6:
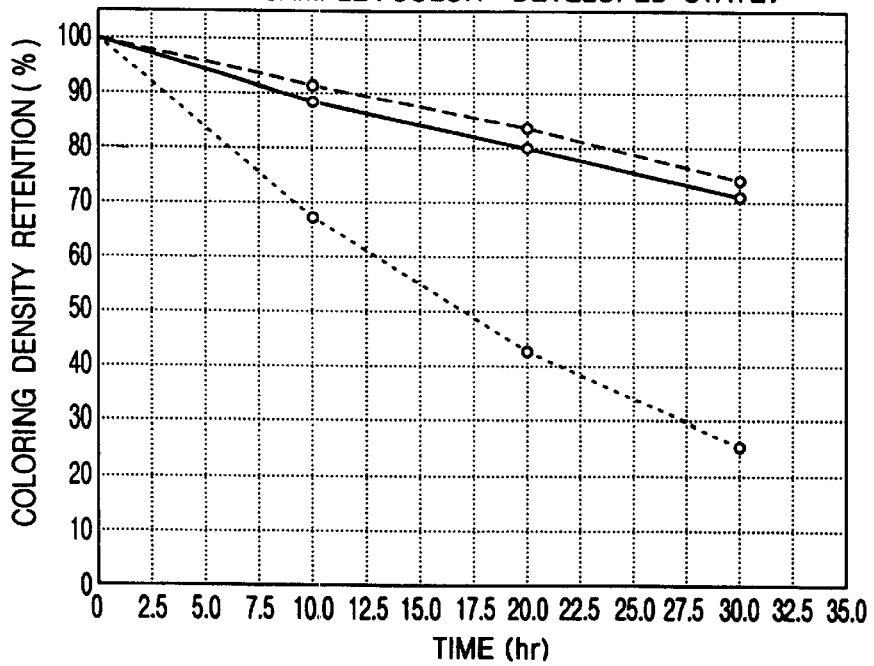

Straight lines in FIG. 6 indicate the results of Examples 27 and 28 in this order from the top, and the line at the lowest part, Comparative Example 5. As is seen from FIG. 6, the reversible thermochromic compositions according to the present invention exhibit a very good light-fastness at the time of color development.

Figure 7:
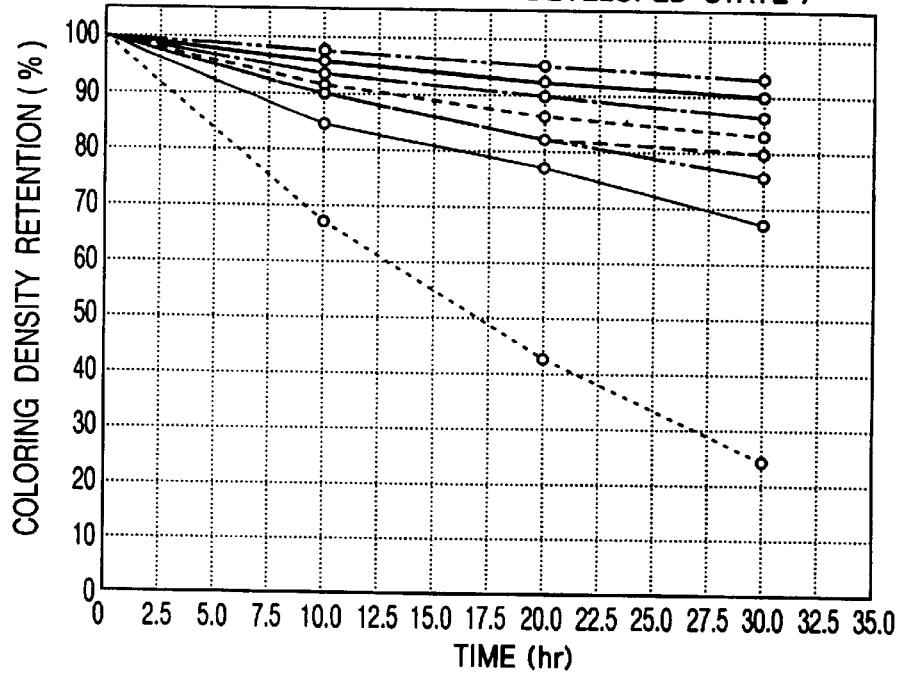

Straight lines in FIG. 7 indicate the results of Examples 34, 35, 33, 31, 32, 30 and 29 in this order from the top, and the line at the lowest part, Comparative Example 6. As is seen from FIG. 7, the reversible thermochromic compositions according to the present invention exhibit a very good light-fastness at the time of color development.

Figure 8:
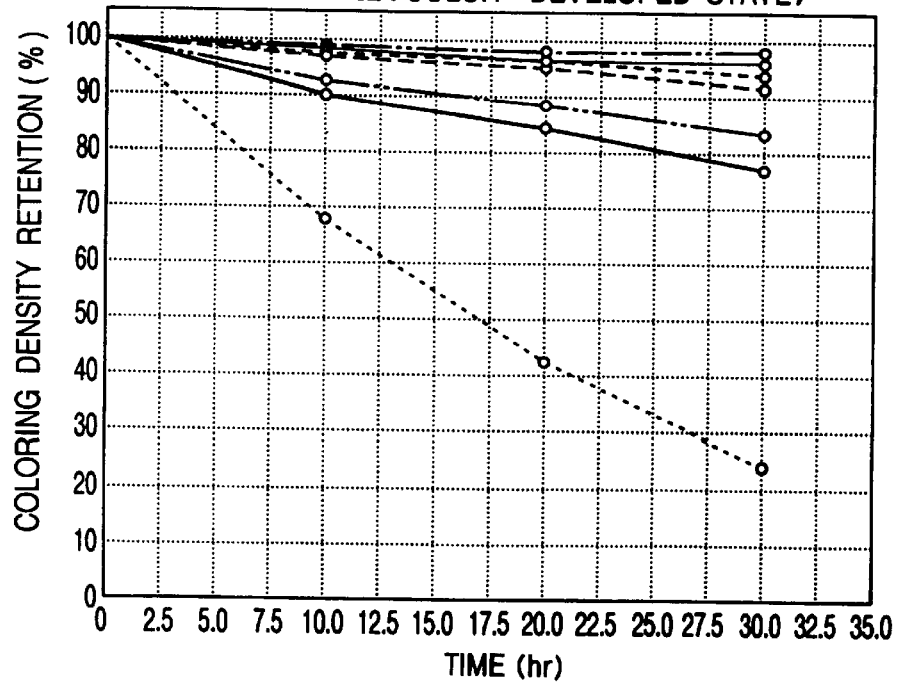

Straight lines in FIG. 8 indicate the results of Examples 37, 36, 38, 39, 40 and 41 in this order from the top, and the line at the lowest part, Comparative Example 6. As is seen from FIG. 8, the reversible thermochromic compositions according to the present invention exhibit a very good light-fastness at the time of color development.

Figure 9:
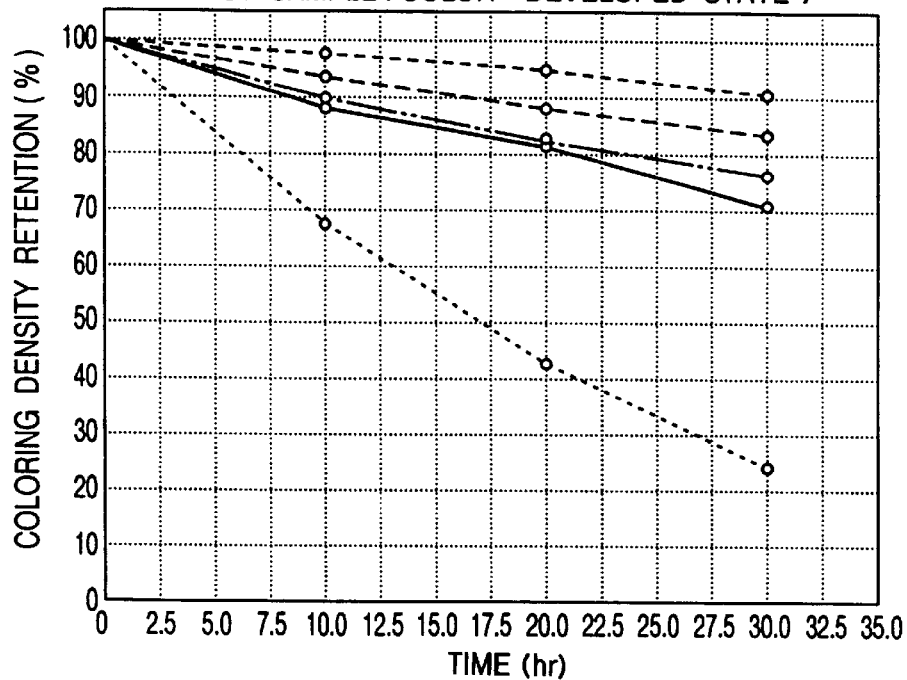

Straight lines in FIG. 9 indicate the results of Examples 42, 43, 44 and 45 in this order from the top, and the line at the lowest part, Comparative Example 6. As is seen from FIG. 9, the reversible thermochromic compositions according to the present invention exhibit a very good light-fastness at the time of color development.

Figure 10:
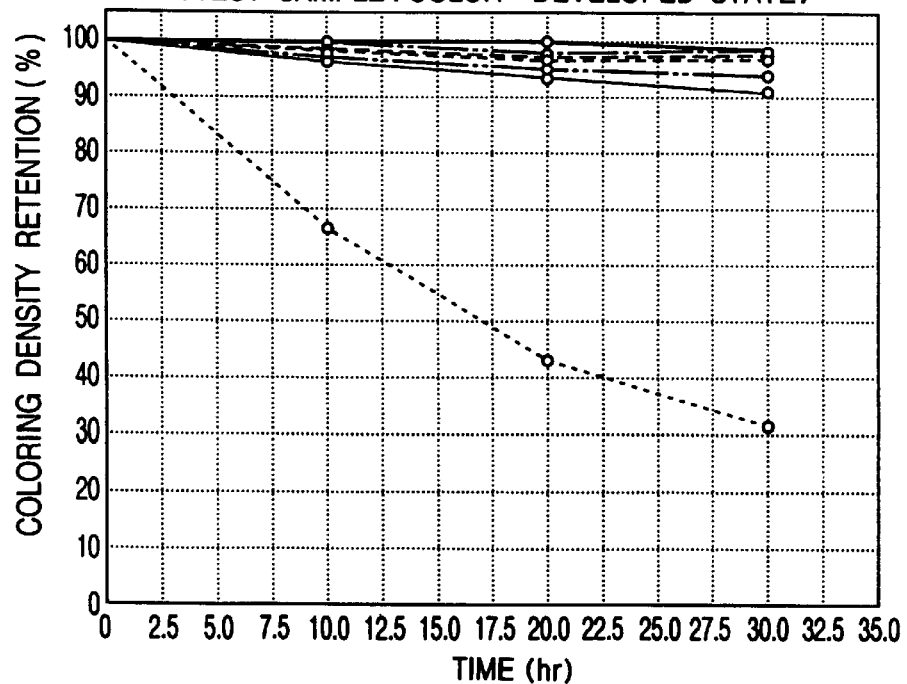

Straight lines in FIG. 10 indicate the results of Examples 51, 50, 49, 48, 47 and 46 in this order from the top, and the line at the lowest part, Comparative Example 7. As is seen from FIG. 10, the reversible thermochromic compositions according to the present invention exhibit a very good light-fastness at the time of color development.

Figure 11:
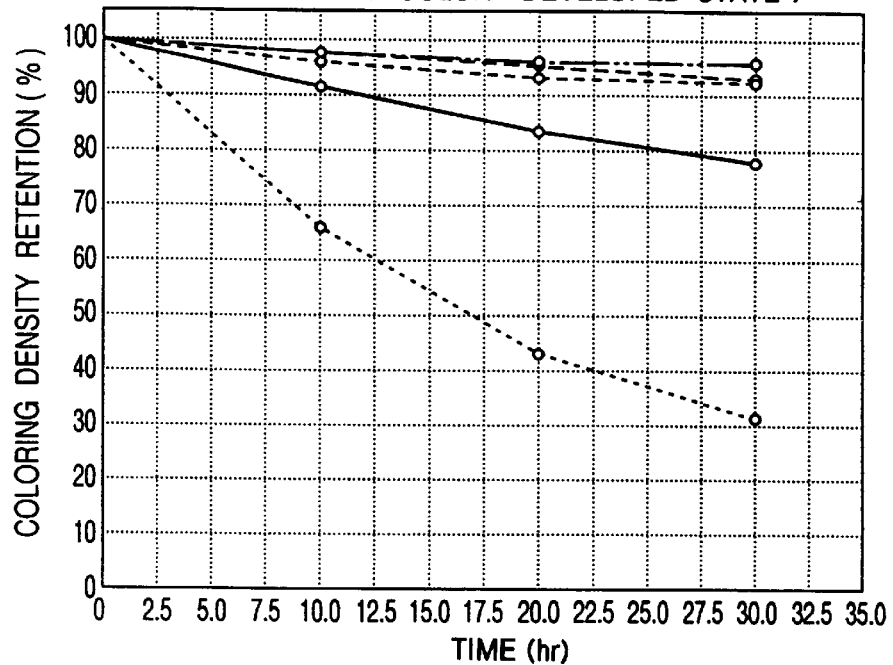

Straight lines in FIG. 11 indicate the results of Examples 54, 53, 52 and 55 in this order from the top, and the line at the lowest part, Comparative Example 7. As is seen from FIG. 11, the reversible thermochromic compositions according to the present invention exhibit a very good light-fastness at the time of color development.

Figure 12:
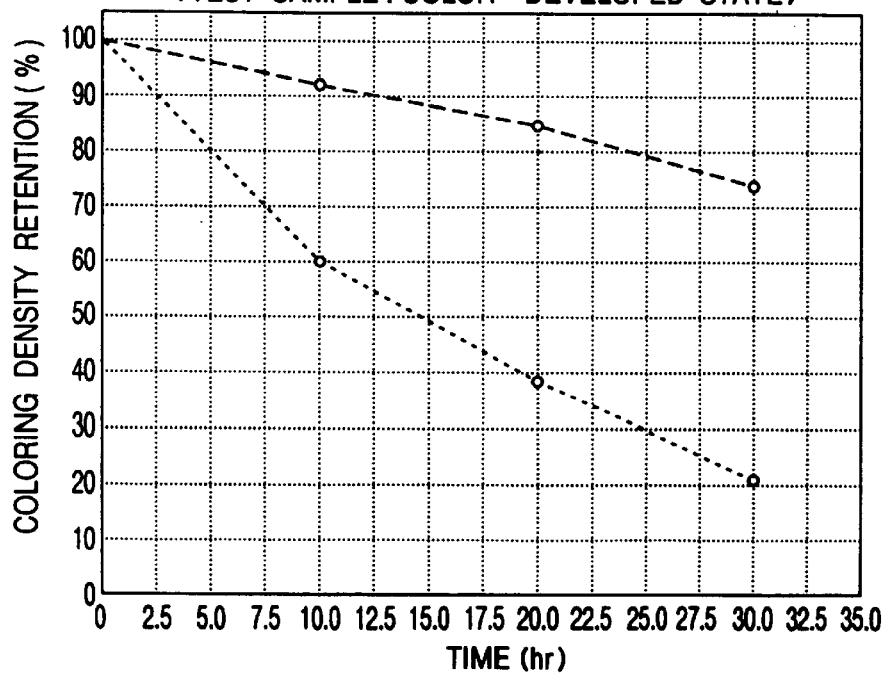

Straight lines in FIG. 12 indicate the results of Example 56 and Comparative Example 8 in this order from the top. As is seen from FIG. 12, the reversible thermochromic composition according to the present invention exhibit a very good light-fastness at the time of color development.

Figure 13:
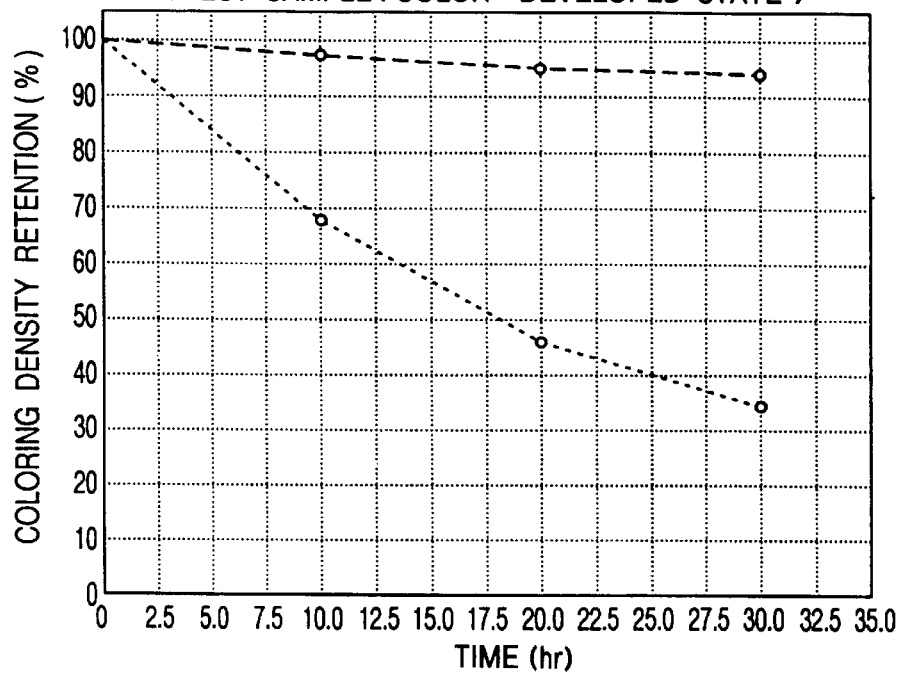

Straight lines in FIG. 13 indicate the results of Example 57 and Comparative Example 9 in this order from the top. As is seen from FIG. 13, the reversible thermochromic composition according to the present invention exhibit a very good light-fastness at the time of color development.

Figure 14:
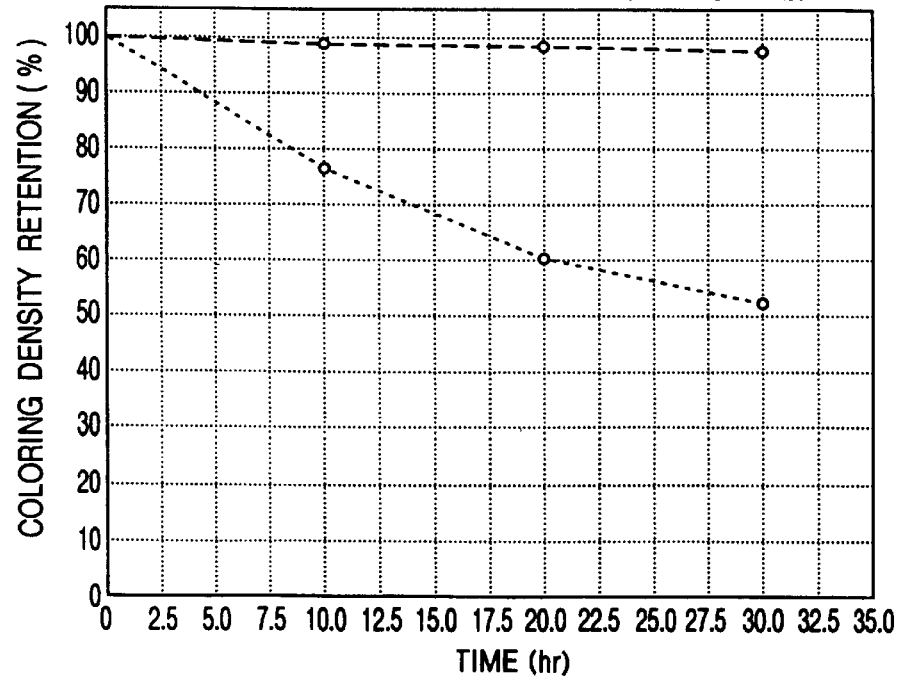

Straight lines in FIG. 14 indicate the results of Example 58 and Comparative Example 10 in this order from the top. As is seen from FIG. 14, the reversible thermochromic composition according to the present invention exhibit a very good light-fastness at the time of color development.

Figure 15:
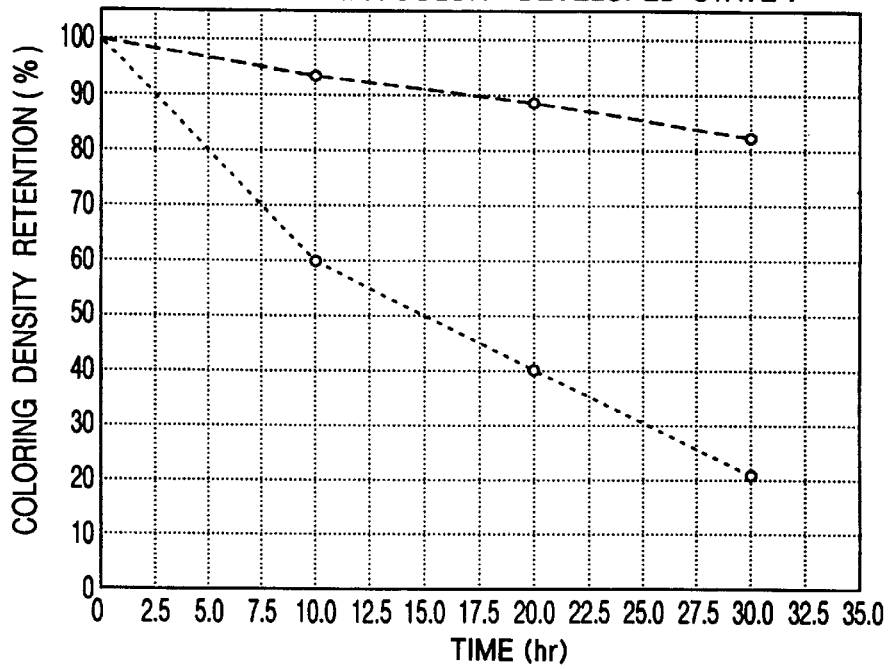

Straight lines in FIG. 15 indicate the results of Example 59 and Comparative Example 11 in this order from the top. As is seen from FIG. 15, the reversible thermochromic composition according to the present invention exhibit a very good light-fastness at the time of color development.

Figure 16:
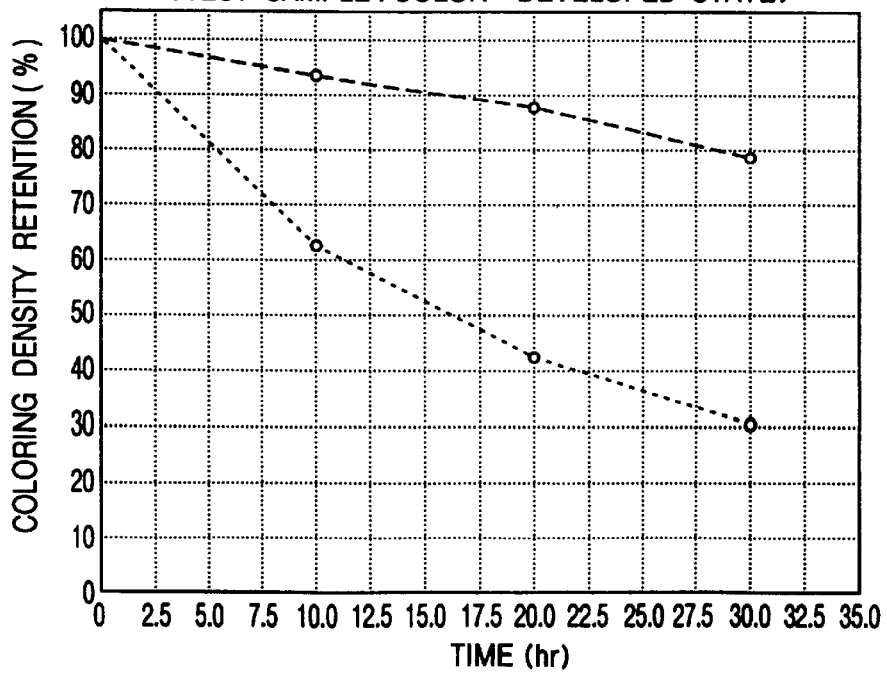

Straight lines in FIG. 16 indicate the results of Example 60 and Comparative Example 12 in this order from the top. As is seen from FIG. 16, the reversible thermochromic composition according to the present invention exhibit a very good light-fastness at the time of color development.

Figure 17:
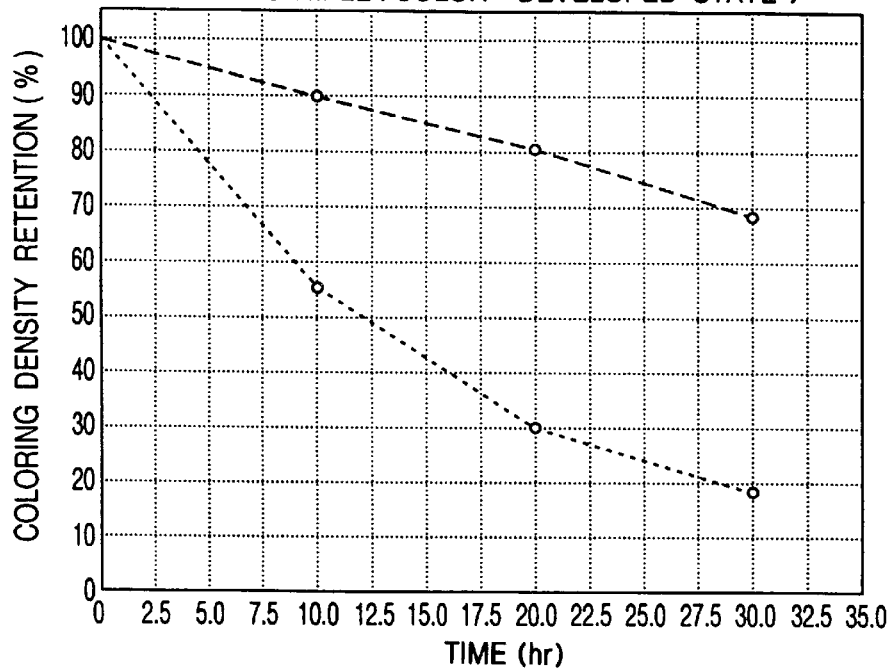

Straight lines in FIG. 17 indicate the results of Example 61 and Comparative Example 13 in this order from the top. As is seen from FIG. 17, the reversible thermochromic composition according to the present invention exhibit a very good light-fastness at the time of color development.

FIGS. 18 to 40 are graphical representations of the attenuation of coloring density in the northlight test.

With regard to FIGS. 35 to 38, the test was made at an ambient temperature of 5° C., and with regard to the other Figures, at 20 ° C.

FIGS. 18 to 40 show the test results obtained in Examples 62 to 132 shown in Tables 23 to 27 and the test results obtained in Comparative Examples 14 to 32 shown in Tables 29 and 30.

Figure 18:
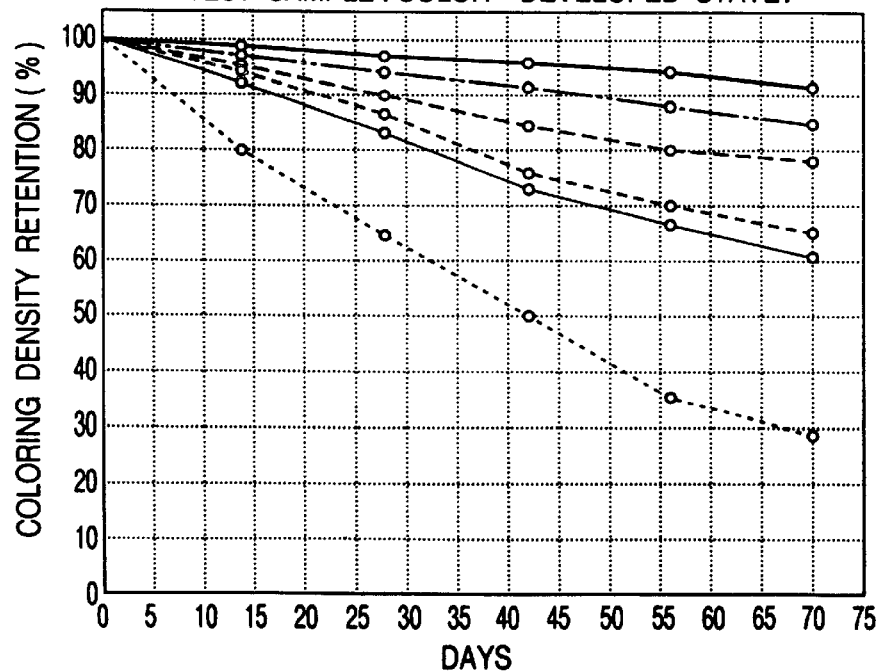

Straight lines in FIG. 18 indicate the results of Examples 66, 65, 64, 63 and 62 in this order from the top, and the line at the lowest part, Comparative Example 14. As is seen from FIG. 18, the reversible thermochromic compositions according to the present invention exhibit a very good light-fastness at the time of color development.

Figure 19:
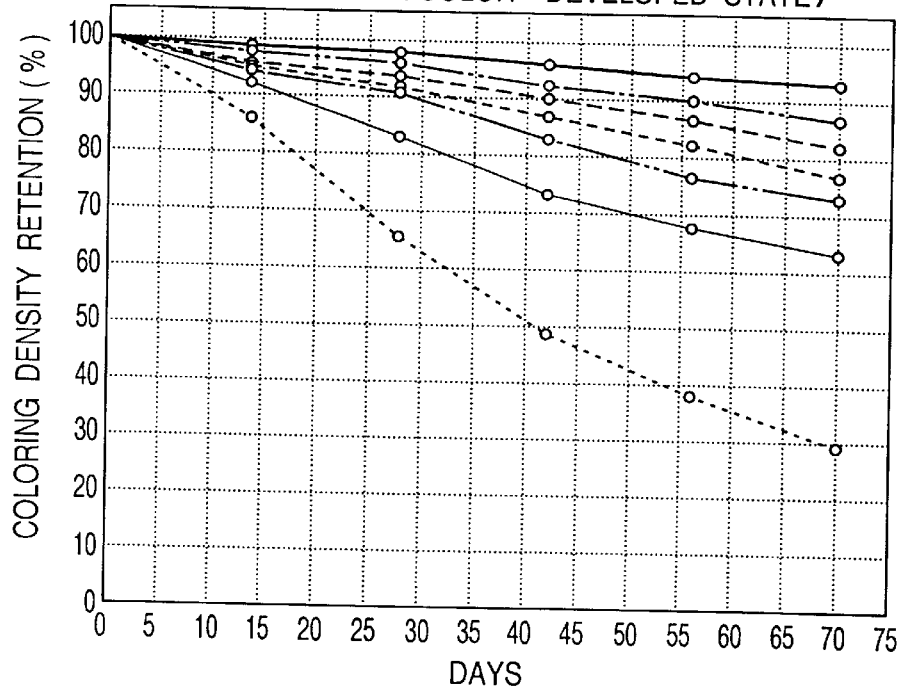

Straight lines in FIG. 19 indicate the results of Examples 72, 71, 70, 69, 68 and 67 in this order from the top, and the line at the lowest part, Comparative Example 15. As is seen from FIG. 19, the reversible thermochromic compositions according to the present invention exhibit a very good light-fastness at the time of color development.

Figure 20:
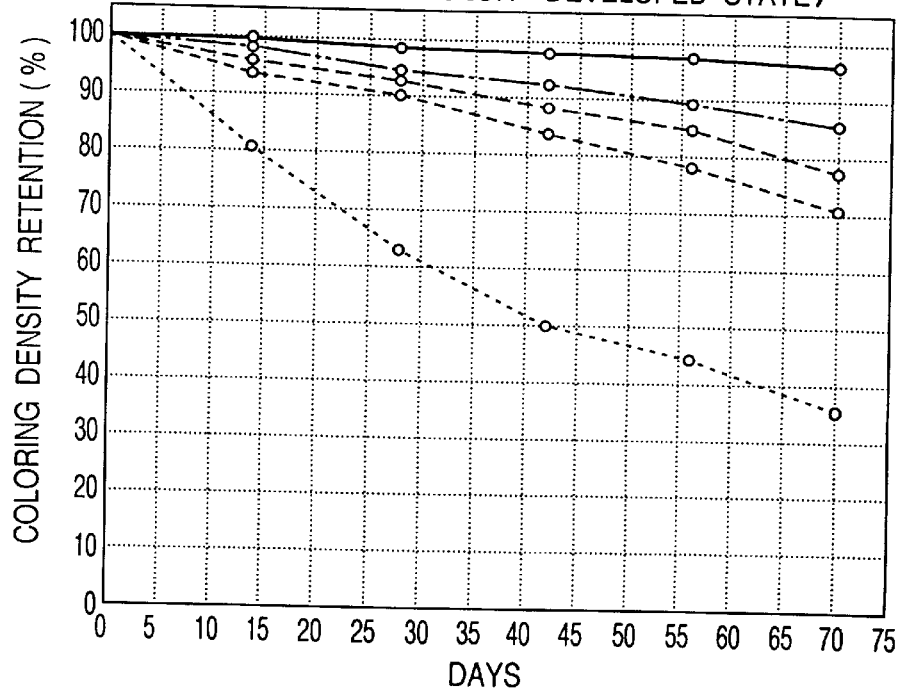

Straight lines in FIG. 20 indicate the results of Examples 76, 75, 74 and 73 in this order from the top, and the line at the lowest part, Comparative Example 16. As is seen from FIG. 20, the reversible thermochromic compositions according to the present invention exhibit a very good light-fastness at the time of color development.

Figure 21:
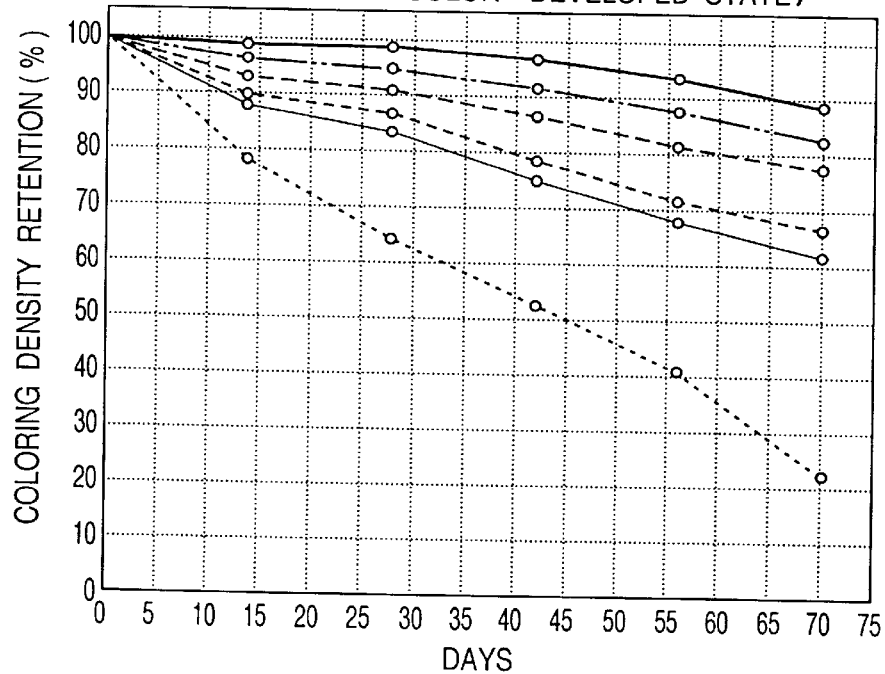

Straight lines in FIG. 21 indicate the results of Examples 81, 80, 79, 78 and 77 in this order from the top, and the line at the lowest part, Comparative Example 17. As is seen from FIG. 21, the reversible thermochromic compositions according to the present invention exhibit a very good light-fastness at the time of color development.

Figure 22:
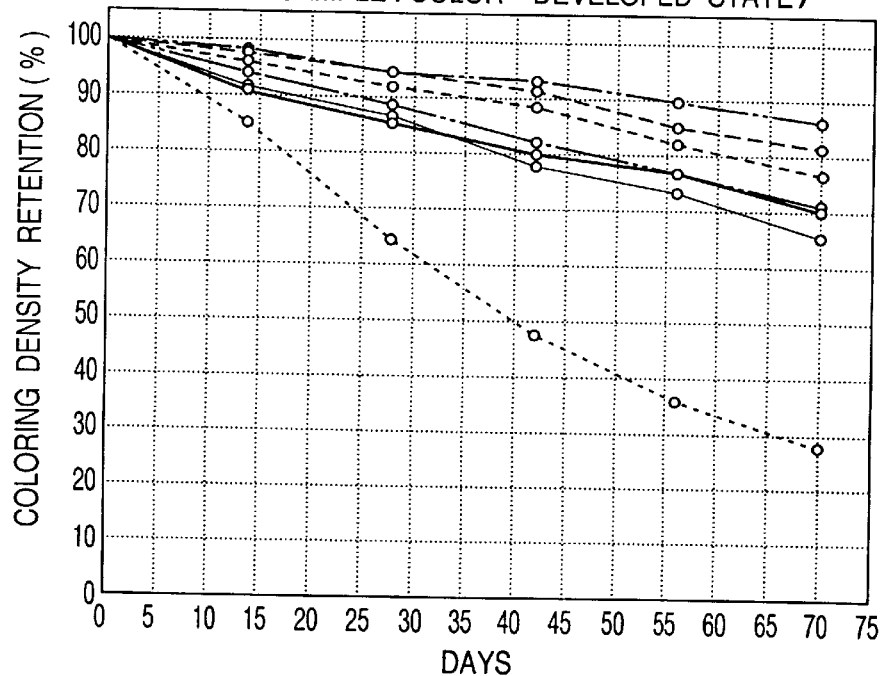

Straight lines in FIG. 22 indicate the results of Examples 86, 85, 84, 87, 83 and 82 in this order from the top, and the line at the lowest part, Comparative Example 18. As is seen from FIG. 22, the reversible thermochromic compositions according to the present invention exhibit a very good light-fastness at the time of color development.

Figure 23:
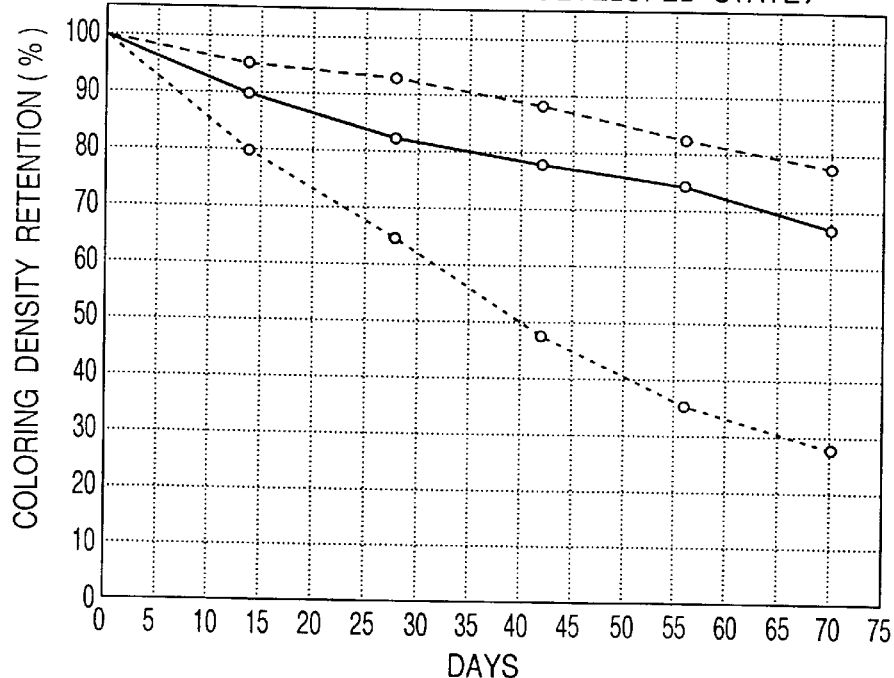

Straight lines in FIG. 23 indicate the results of Examples 88 and 89 in this order from the top, and the line at the lowest part, Comparative Example 18. As is seen from FIG. 23, the reversible thermochromic compositions according to the present invention exhibit a very good light-fastness at the time of color development.

Figure 24:
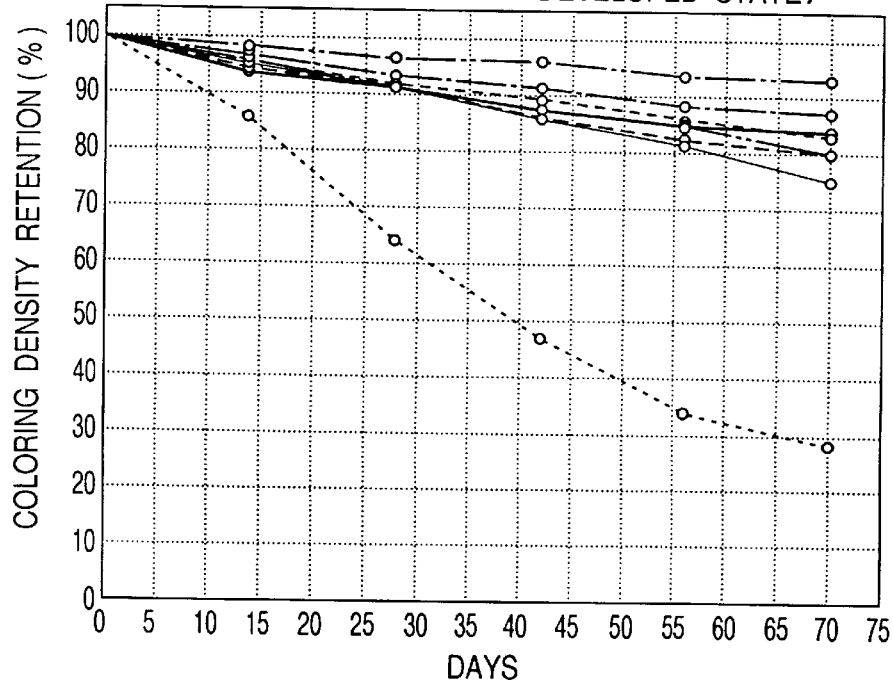

Straight lines in FIG. 24 indicate the results of Examples 95, 94, 92, 96, 91, 93 and 90 in this order from the top, and the line at the lowest part, Comparative Example 19. As is seen from FIG. 24, the reversible thermochromic compositions according to the present invention exhibit a very good light-fastness at the time of color development.

Figure 25:
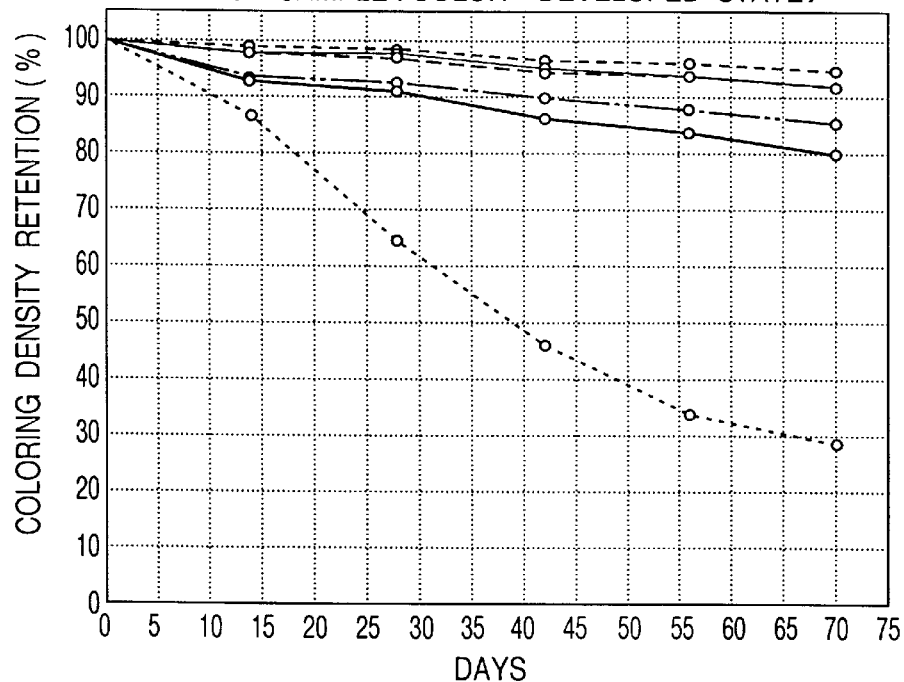

Straight lines in FIG. 25 indicate the results of Examples 99, 98, 97, 100, 101 and 102 in this order from the top, and the line at the lowest part, Comparative Example 19. As is seen from FIG. 25, the reversible thermochromic compositions according to the present invention exhibit a very good light-fastness at the time of color development.

Figure 26:
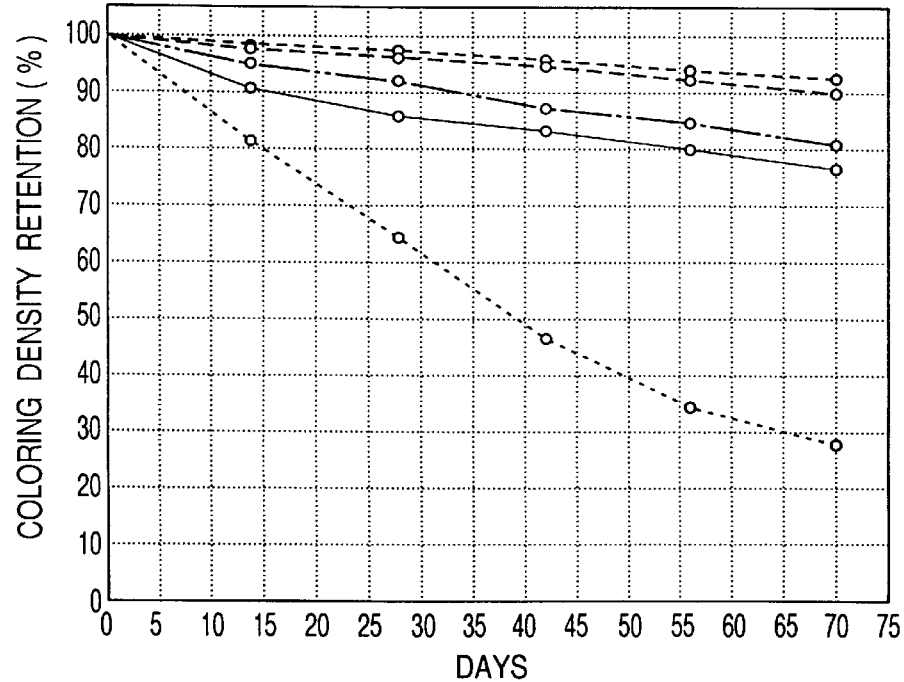

Straight lines in FIG. 26 indicate the results of Examples 103, 104, 105 and 106 in this order from the top, and the line at the lowest part, Comparative Example 19. As is seen from FIG. 26, the reversible thermochromic compositions according to the present invention exhibit a very good light-fastness at the time of color development.

Figure 27:
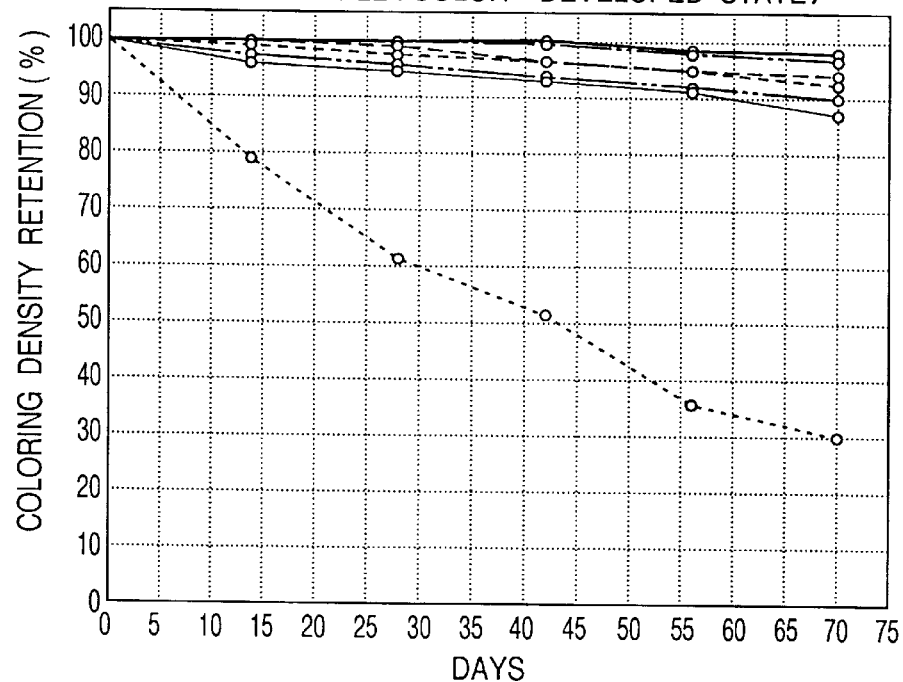

Straight lines in FIG. 27 indicate the results of Examples 112, 111, 110, 109, 108 and 107 in this order from the top, and the line at the lowest part, Comparative Example 20. As is seen from FIG. 27, the reversible thermochromic compositions according to the present invention exhibit a very good light-fastness at the time of color development.

Figure 28:
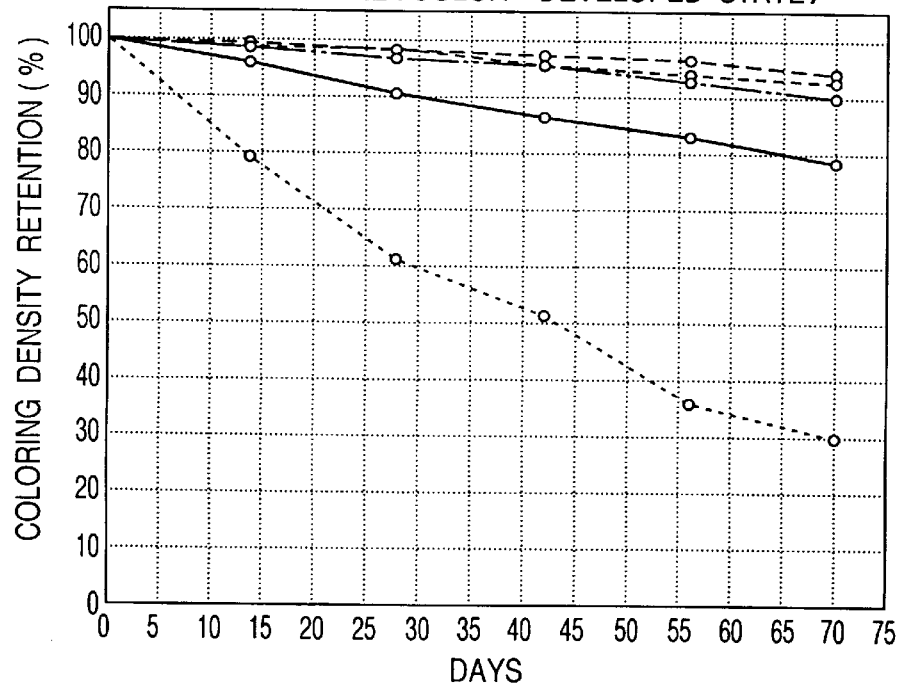

Straight lines in FIG. 28 indicate the results of Examples 114, 113, 115 and 116 in this order from the top, and the line at the lowest part, Comparative Example 20. As is seen from FIG. 28, the reversible thermochromic compositions according to the present invention exhibit a very good light-fastness at the time of color development.

Figure 29:
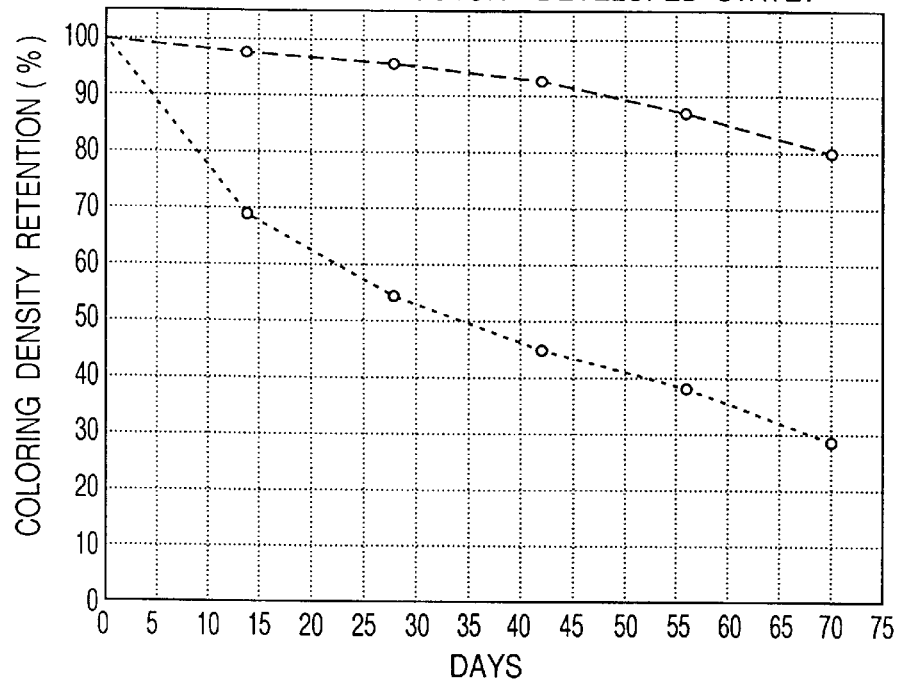

Straight lines in FIG. 29 indicate the results of Example 117 and Comparative Example 21 in this order from the top. As is seen from FIG. 29, the reversible thermochromic composition according to the present invention exhibit a very good light-fastness at the time of color development.

Figure 30:
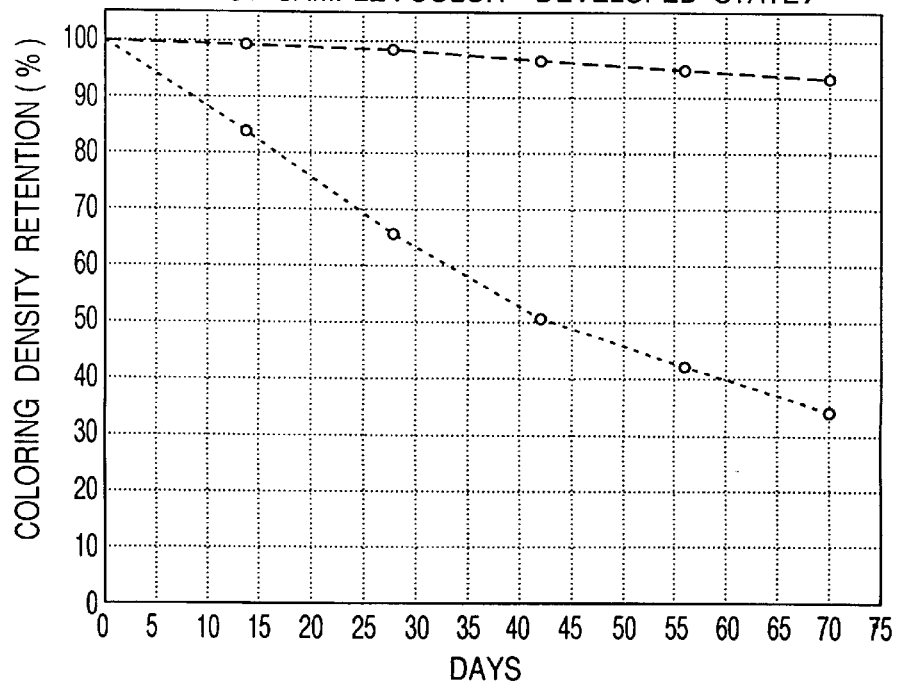

Straight lines in FIG. 30 indicate the results of Example 118 and Comparative Example 22 in this order from the top. As is seen from FIG. 30, the reversible thermochromic composition according to the present invention exhibit a very good light-fastness at the time of color development.

Figure 31:
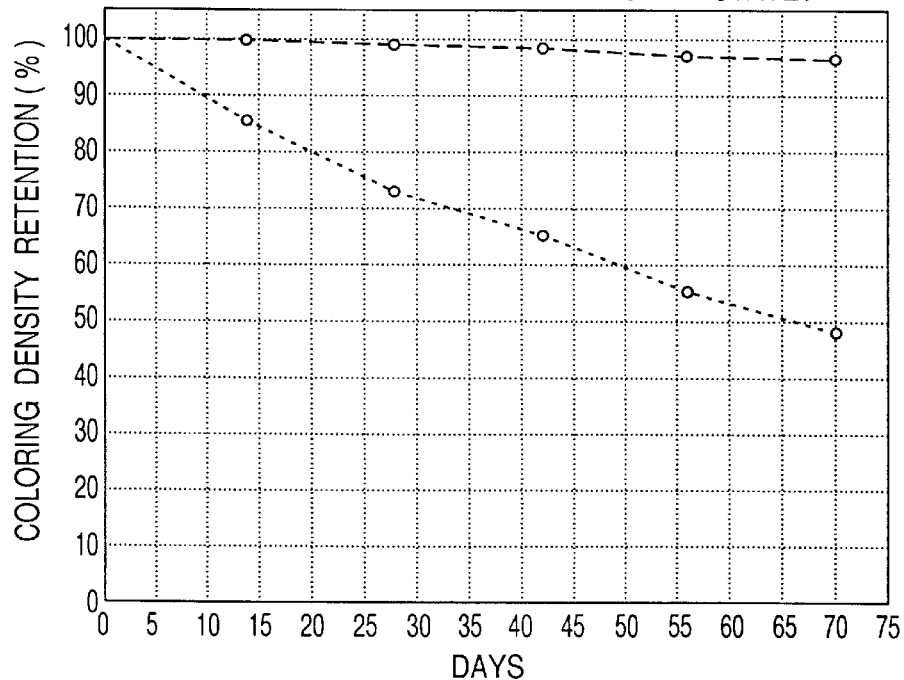

Straight lines in FIG. 31 indicate the results of Example 119 and Comparative Example 23 in this order from the top. As is seen from FIG. 31, the reversible thermochromic composition according to the present invention exhibit a very good light-fastness at the time of color development.

Figure 32:
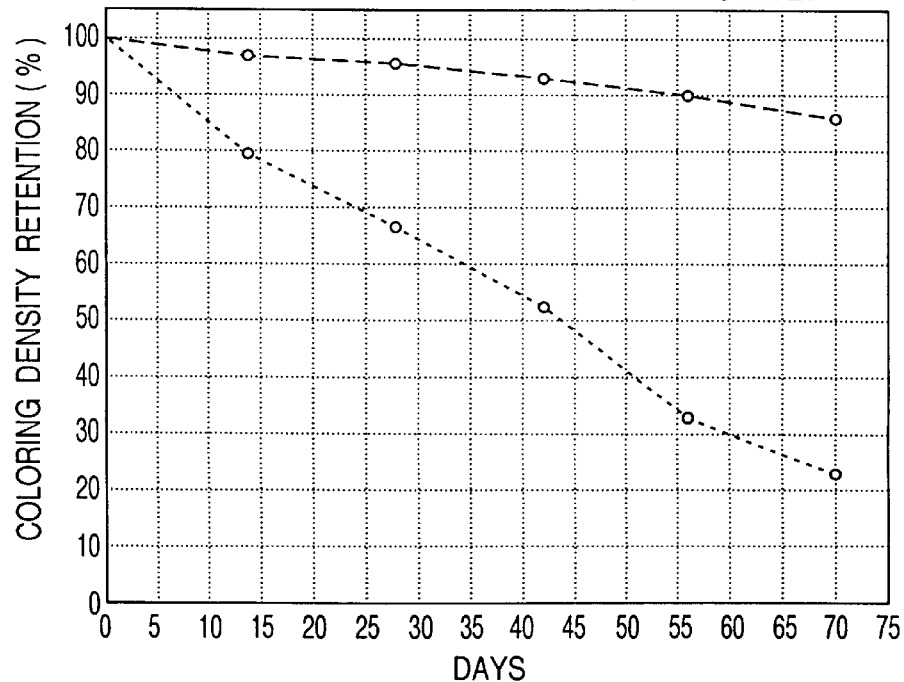

Straight lines in FIG. 32 indicate the results of Example 120 and Comparative Example 24 in this order from the top. As is seen from FIG. 32, the reversible thermochromic composition according to the present invention exhibit a very good light-fastness at the time of color development.

Figure 33:
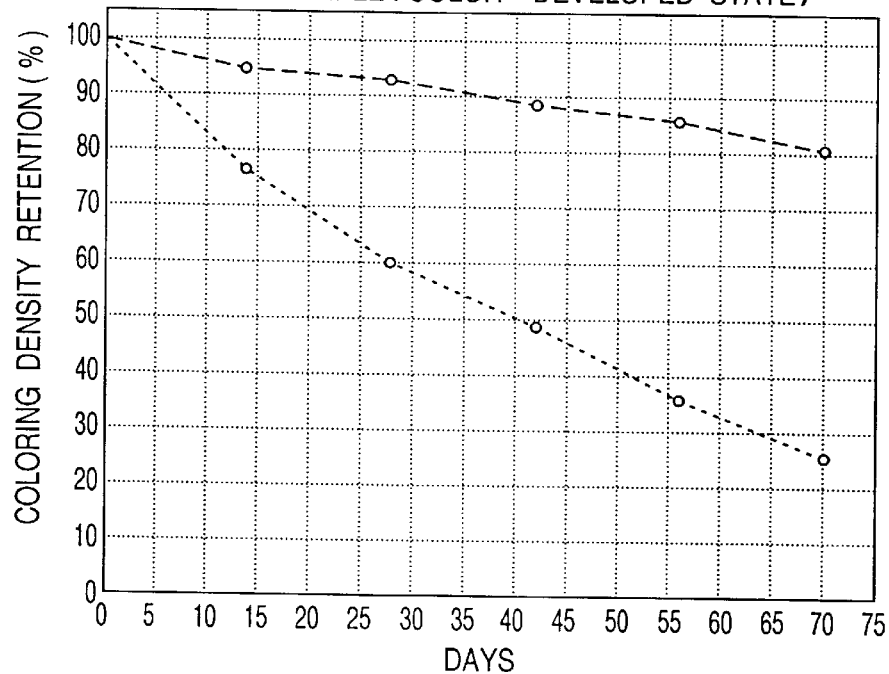

Straight lines in FIG. 33 indicate the results of Example 121 and Comparative Example 25 in this order from the top. As is seen from FIG. 33, the reversible thermochromic composition according to the present invention exhibit a very good light-fastness at the time of color development.

Figure 34:
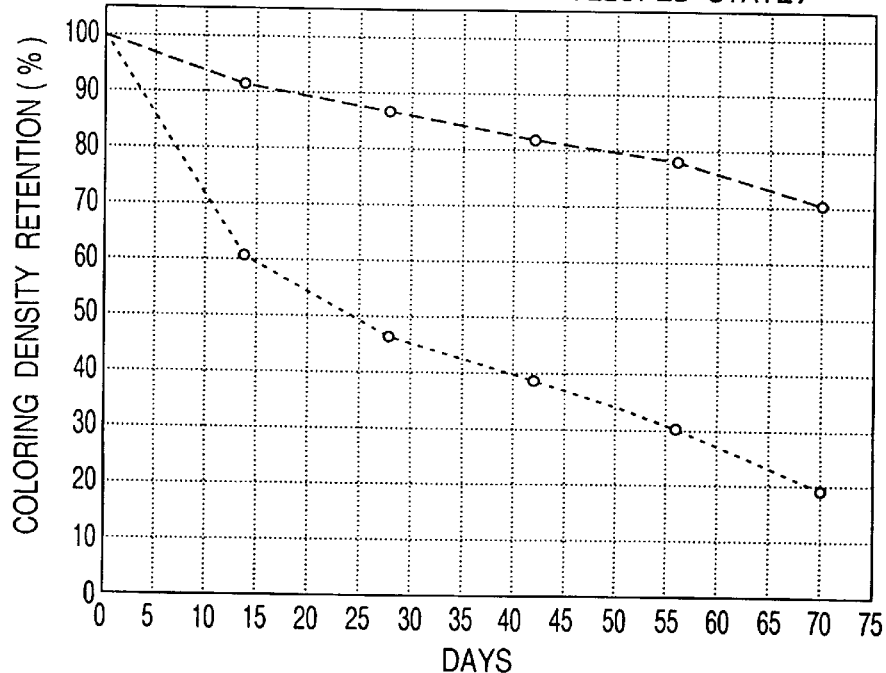

Straight lines in FIG. 34 indicate the results of Example 122 and Comparative Example 26 in this order from the top. As is seen from FIG. 34, the reversible thermochromic composition according to the present invention exhibit a very good light-fastness at the time of color development.

Figure 35:
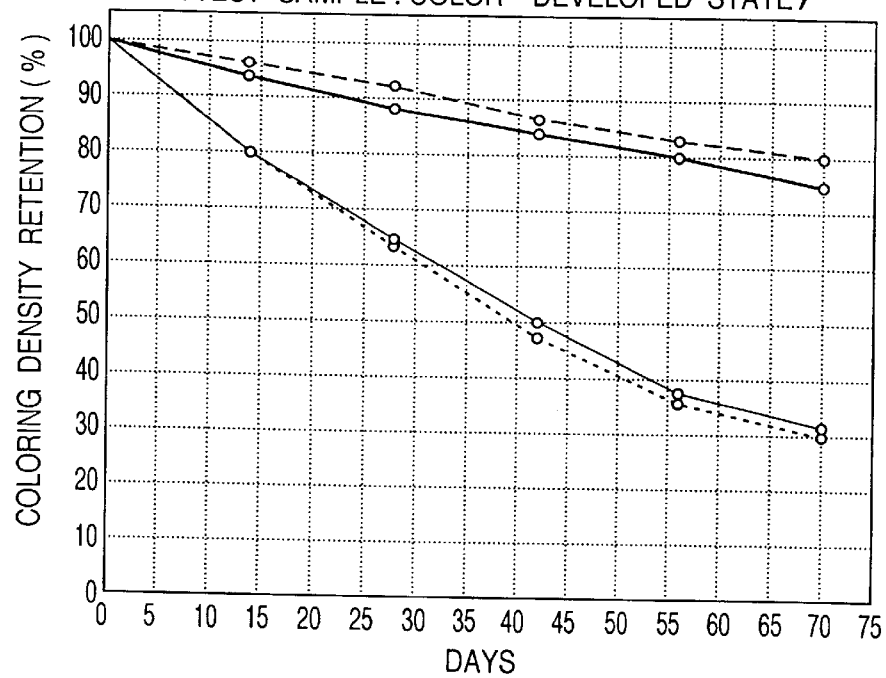

Straight lines in FIG. 35 indicate the results of Examples 123 and 124 in this order from the top, and the lines at the lower part, Comparative Examples 28 and 27 in this order. As is seen from FIG. 35, the reversible thermochromic compositions according to the present invention exhibit a very good light-fastness at the time of color development.

Figure 36:
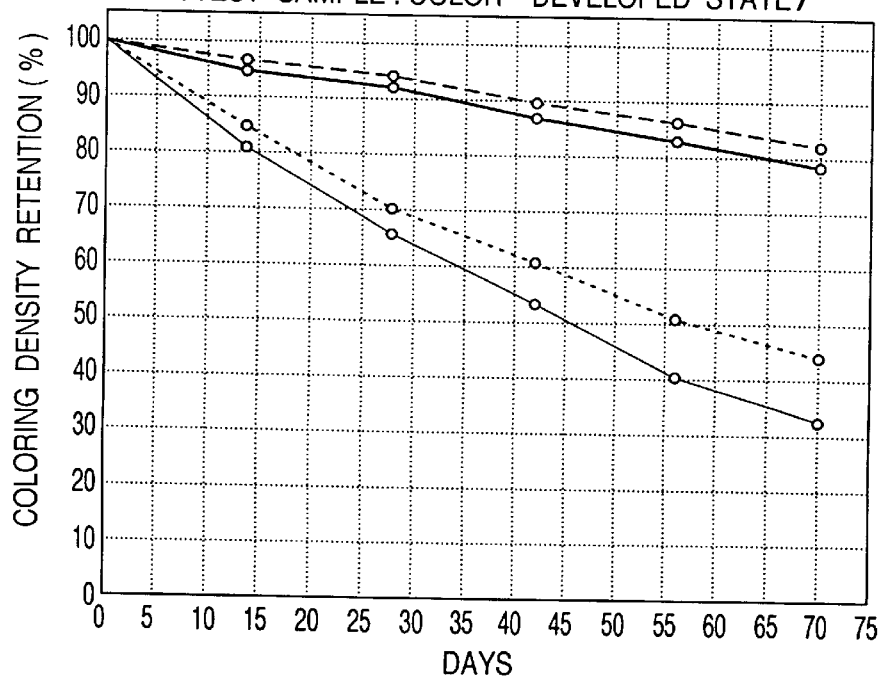

Straight lines in FIG. 36 indicate the results of Examples 125 and 126 in this order from the top, and the lines at the lower part, Comparative Examples 30 and 31 in this order. As is seen from FIG. 36, the reversible thermochromic compositions according to the present invention exhibit a very good light-fastness at the time of color development.

Figure 37:
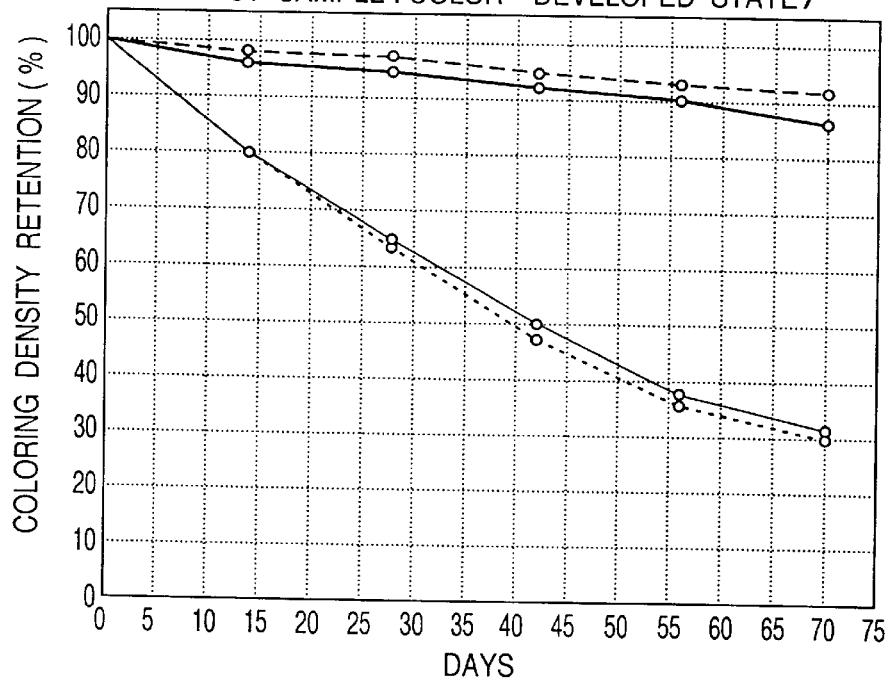

Straight lines in FIG. 37 indicate the results of Examples 127 and 128 in this order from the top, and the lines at the lower part, Comparative Examples 28 and 27 in this order. As is seen from FIG. 37, the reversible thermochromic compositions according to the present invention exhibit a very good light-fastness at the time of color development.

Figure 38:
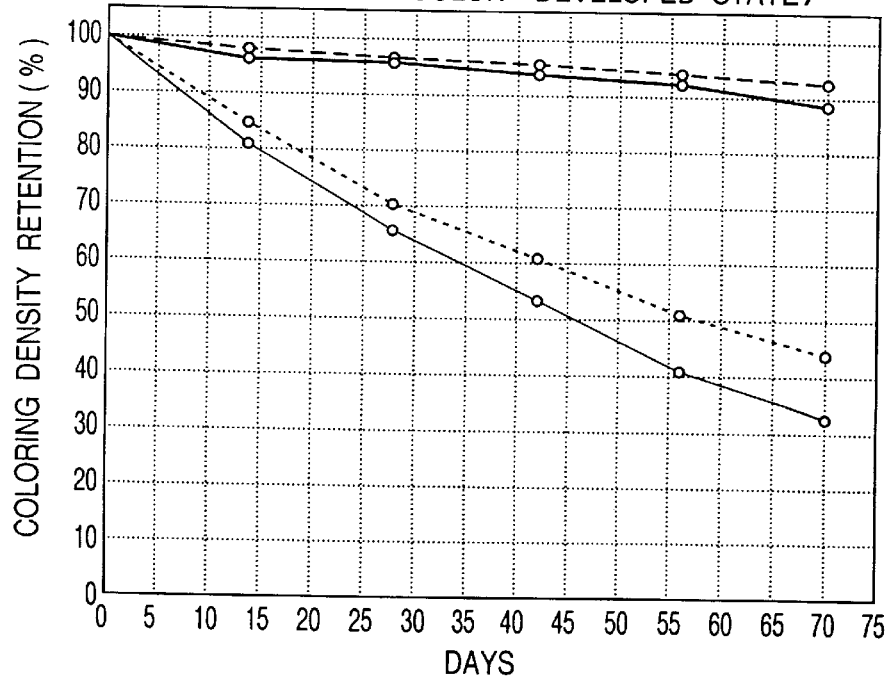

Straight lines in FIG. 38 indicate the results of Examples 129 and 130 in this order from the top, and the lines at the lower part, Comparative Examples 30 and 31 in this order. As is seen from FIG. 38, the reversible thermochromic compositions according to the present invention exhibit a very good light-fastness at the time of color development.

Figure 39:
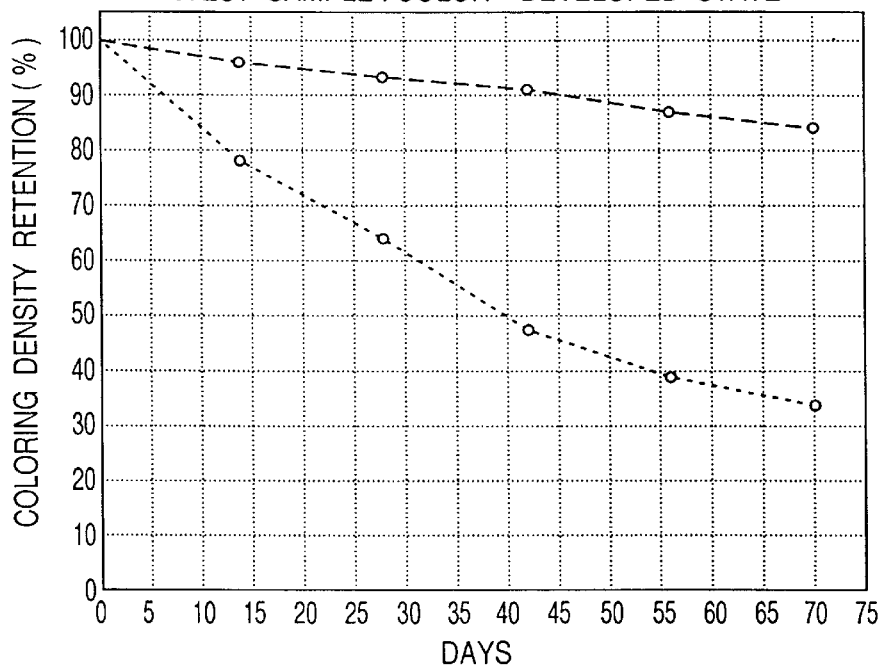

Straight lines in FIG. 39 indicate the results of Example 131 and Comparative Example 29 in this order from the top. As is seen from FIG. 39, the reversible thermochromic composition according to the present invention exhibit a very good light-fastness at the time of color development.

Figure 40:
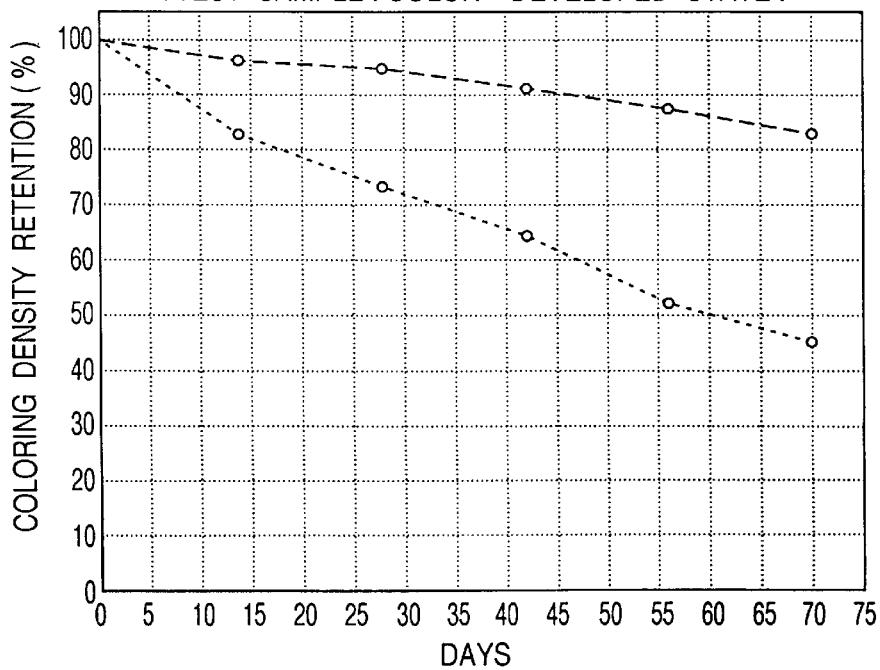

Straight lines in FIG. 40 indicate the results of Example 132 and Comparative Example 32 in this order from the top. As is seen from FIG. 40, the reversible thermochromic composition according to the present invention exhibit a very good light-fastness at the time of color development.

As described above, the present invention has an excellent effect that, by the use of the light-fastness providing agent having the specific chemical structure, reversible thermochromic compositions, which have ever had a low light-fastness, can be prevented from being aged by light as a result of electron donating-accepting reaction when they are in the color-developed state, and can thereby be greatly improved in light-fastness.

TABLE 5

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 1 | 3-(N-isobutyl-N-ethylamino)-7,8-benzofluoran (1.0) | 4,4'-methylene-bisphenol (4.0) | stearyl alcohol (50.0) | 1,1-bis(4'-hydroxyphenyl)-n-decane (2.0) | pink ←→ colorless (50° C.) |
| 2 | 3-(N-isobutyl-N-ethylamino)-7,8-benzofluoran (1.0) | 4,4'-methylene-bisphenol (3.0) | stearyl alcohol (50.0) | 1,1-bis(4'-hydroxyphenyl)-n-decane (3.0) | pink ←→ colorless (50° C.) |

TABLE 5-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 3 | 3-(N-isobutyl-N-ethylamino)-7,8-benzofluoran (1.0) | 4,4'-methylene-bisphenol (2.0) | stearyl alcohol (50.0) | 1,1-bis(4'-hydroxyphenyl)-n-decane (4.0) | pink ←→ colorless (50° C.) |
| 4 | 3-(N-isobutyl-N-ethylamino)-7,8-benzofluoran (1.0) | 4,4'-methylene-bisphenol (1.0) | stearyl alcohol (50.0) | 1,1-bis(4'-hydroxyphenyl)-n-decane (5.0) | pink ←→ colorless (50° C.) |
| 5 | 3-(N-isobutyl-N-ethylamino)-7,8-benzofluoran (1.0) | — | stearyl alcohol (50.0) | 1,1-bis(4'-hydroxyphenyl)-n-decane (6.0) | pink ←→ colorless (50° C.) |
| 6 | 3-[2-ethoxy-4-(N-ethylanilino)-phenyl]-3-(1-ethyl-2-methyl-indol-3-yl)-4-azaphthalide (1.0) | 1,1-bis(4-hydroxyphenyl)-ethane (5.0) | stearyl alcohol/stearyl palmitate (25.0/25.0) | 1,1-bis-(4'-hydroxyphenyl)-n-undecyl (3.0) | blue ←→ colorless (45° C.) |
| 7 | 3-[2-ethoxy-4-(N-ethylanilino)-phenyl]-3-(1-ethyl-2-methyl-indol-3-yl)-4-azaphthalide (1.0) | 1,1-bis(4-hydroxyphenyl)-ethane (4.0) | stearyl alcohol/stearyl palmitate (25.0/25.0) | 1,1-bis-(4'-hydroxyphenyl)-n-undecyl (4.0) | blue ←→ colorless (45° C.) |
| 8 | 3-[2-ethoxy-4-(N-ethylanilino)-phenyl]-3-(1-ethyl-2-methyl-indol-3-yl)-4-azaphthalide (1.0) | 1,1-bis(4-hydroxyphenyl)-ethane (3.0) | stearyl alcohol/stearyl palmitate (25.0/25.0) | 1,1-bis-(4'-hydroxyphenyl)-n-undecyl (5.0) | blue ←→ colorless (45° C.) |
| 9 | 3-[2-ethoxy-4-(N-ethylanilino)-phenyl]-3-(1-ethyl-2-methyl-indol-3-yl)-4-azaphthalide (1.0) | 1,1-bis(4-hydroxyphenyl)-ethane (2.0) | stearyl alcohol/stearyl palmitate (25.0/25.0) | 1,1-bis-(4'-hydroxyphenyl)-n-undecyl (6.0) | blue ←→ colorless (45° C.) |

TABLE 6

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 10 | 3-[2-ethoxy-4-(N-ethylanilino)-phenyl]-3-(1-ethyl-2-methyl-indol-3-yl)-4-azaphthalide (1.0) | 1,1-bis-(4-hydroxyphenyl)-ethane (1.0) | stearyl alcohol/stearyl palmitate (25.0/25.0) | 1,1-bis-(4'-hydroxyphenyl)-n-undecyl (7.0) | blue ←→ colorless (45° C.) |
| 11 | 3-[2-ethoxy-4-(N-ethylanilino)-phenyl]-3-(1-ethyl-2-methyl-indol-3-yl)-4-azaphthalide (1.0) | — | stearyl alcohol/stearyl palmitate (25.0/25.0) | 1,1-bis-(4'-hydroxyphenyl)-n-undecyl (8.0) | blue ←→ colorless (45° C.) |
| 12 | 2-chloro-3-methyl-6-diethylamino-fluoran (2.0) | 1,1-bis-(4-hydroxyphenyl)-propane (6.0) | tetradecy ether/stearyl caprate (25.0/25.0) | 1,1-bis-(4'-hydroxyphenyl)-n-dodecane (4.0) | vermilion ←→ colorless (35° C.) |
| 13 | 2-chloro-3-methyl-6-diethylamino-fluoran (2.0) | 1,1-bis-(4-hydroxyphenyl)-propane (4.0) | tetradecy ether/stearyl caprate (25.0/25.0) | 1,1-bis-(4'-hydroxyphenyl)-n-dodecane (6.0) | vermilion ←→ colorless (35° C.) |
| 14 | 2-chloro-3-methyl-6-diethylamino-fluoran (2.0) | 1,1-bis-(4-hydroxyphenyl)-propane (2.0) | tetradecy ether/stearyl caprate (25.0/25.0) | 1,1-bis-(4'-hydroxyphenyl)-n-dodecane (8.0) | vermilion ←→ colorless (35° C.) |
| 15 | 2-chloro-3-methyl-6-diethylamino-fluoran | — | tetradecy ether/stearyl caprate | 1,1-bis-(4'-hydroxyphenyl)-n-dodecane | vermilion ←→ colorless (35° C.) |

TABLE 6-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| | (2.0) | | (25.0/25.0) | (10.0) | |
| 16 | 2-(2-chloro-anilino)-6-di-n-butylaminofluoran (4.0) | 1,1-bis-(4-hydroxyphenyl)-2-methylpropane (8.0) | 8-penta-decane (50.0) | 1,1-bis-(4'-hydroxyphenyl)-n-tetradecane (4.0) | black ←→ colorless (7° C. 29° C.) |
| 17 | 2-(2-chloro-anilino)-6-di-n-butylaminofluoran (4.0) | 1,1-bis-(4-hydroxyphenyl)-2-methylpropane (6.0) | 8-penta-decane (50.0) | 1,1-bis-(4'-hydroxyphenyl)-n-tetradecane (6.0) | black ←→ colorless (7° C. 29° C.) |
| 18 | 2-(2-chloro-anilino)-6-di-n-butylaminofluoran (4.0) | 1,1-bis-(4-hydroxyphenyl)-2-methylpropane (4.0) | 8-penta-decane (50.0) | 1,1-bis-(4'-hydroxyphenyl)-n-tetradecane (8.0) | black ←→ colorless (7° C. 29° C.) |

TABLE 7

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 19 | 2-(2-chloro-anilino)-6-di-n-butylaminofluoran (4.0) | 1,1-bis-(4-hydroxyphenyl)-2-methylpropane (2.0) | 8-penta-decane (50.0) | 1,1-bis-(4'-hydroxyphenyl)-n-tetradecane (10.0) | black ←→ colorless (7° C. 29° C.) |
| 20 | 2-(2-chloro-anilino)-6-di-n-butylaminofluoran (4.0) | — | 8-penta-decane (50.0) | 1,1-bis-(4'-hydroxyphenyl)-n-tetradecane (12.0) | black ←→ colorless (7° C. 29° C.) |
| 21 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (2.0) | stearyl myristate (50.0) | 1,1-bis-(4'-hydroxyphenyl)-n-hexane (6.0) | blue ←→ colorless (46° C.) |
| 22 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (2.0) | stearyl myristate (50.0) | 1,1-bis-(4'-hydroxyphenyl)-n-octane (6.0) | blue ←→ colorless (46° C.) |
| 23 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (2.0) | stearyl myristate (50.0) | 1,1-bis-(4'-hydroxyphenyl)-n-decane (6.0) | blue ←→ colorless (46° C.) |
| 24 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (2.0) | stearyl myristate (50.0) | 1,1-bis-(4'-hydroxyphenyl)-n-dodecane (6.0) | blue ←→ colorless (46° C.) |
| 25 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (2.0) | stearyl myristate (50.0) | 1,1-bis-(4'-hydroxyphenyl)-n-tetradecane (6.0) | blue ←→ colorless (46° C.) |

TABLE 8

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 26 | 3-[2-ethoxy-4-(N-ethylanilino)-phenyl]-3-(1-ethyl-yl)-4-azaphthalide (1.0) | 2,2-bis-(4-hydroxyphenyl)-propane (2.0) | stearyl myristate (50.0) | 1,1-bis-(4'-hydroxyphenyl)-n-hexadecane | blue ←→ colorless (46° C.) |
| 27 | 3-[2-ethoxy-4-(N-ethylanilino)-phenyl]-3-(1-ethyl-yl)-4-azaphthalide (1.0) | 2,2-bis-(4-hydroxyphenyl)-propane (2.0) | stearyl myristate (50.0) | 1,1-bis-(4'-hydroxy-3'-methylphenyl)-n-decane (6.0) | blue ←→ colorless (46° C.) |
| 28 | 3-[2-ethoxy-4-(N-ethylanilino)-phenyl]-3-(1-ethyl-yl)-4-azaphthalide (1.0) | 2,2-bis-(4-hydroxyphenyl)-propane (2.0) | stearyl myristate (50.0) | 1,1-bis-(4'-hydroxy-3'-chloro)-n-decane (6.0) | blue ←→ colorless (46° C.) |
| 29 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-hexane (6.0) | blue ←→ colorless (10° C.   45° C.) |
| 30 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-heptane (6.0) | blue ←→ colorless (10° C.   45° C.) |
| 31 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-octane (6.0) | blue ←→ colorless (10° C.   45° C.) |
| 32 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-ethylhexane (6.0) | blue ←→ colorless (10° C.   45° C.) |

TABLE 9

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 33 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-nonane (6.0) | blue ←→ colorless (10° C.   45° C.) |
| 34 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-decane (6.0) | blue ←→ colorless (10° C.   45° C.) |
| 35 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-3-methyl-7-dimethylheptane (6.0) | blue ←→ colorless (10° C.   45° C.) |
| 36 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-undecyl (6.0) | blue ←→ colorless (10° C.   45° C.) |

TABLE 9-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 37 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-dodecane (6.0) | blue ←→ colorless (10° C.    45° C.) |
| 38 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-tridecane (6.0) | blue ←→ colorless (10° C.    45° C.) |
| 39 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-tetradecane (6.0) | blue ←→ colorless (10° C.    45° C.) |

TABLE 10

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 40 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-hexadecane (6.0) | blue ←→ colorless (10° C.    45° C.) |
| 41 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxyphenyl)-n-octadecane (6.0) | blue ←→ colorless (10° C.    45° C.) |
| 42 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxy-3'-methylphenyl)-n-decane (6.0) | blue ←→ colorless (10° C.    45° C.) |
| 43 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxy-3',5'-dimethylphenyl)-n-decane (6.0) | blue ←→ colorless (10° C.    45° C.) |
| 44 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxy-3'-t-butylphenyl)-n-decane (6.0) | blue ←→ colorless (10° C.    45° C.) |
| 45 | 3-[2-ethoxy-4-(N-ethylanilino)-phenyl]-3-(1-ethyl-2-methyl-indol-3-yl)-4-azaphthalide (1.0) | — | cetyl benzoate (50.0) | 1,1-bis-(4'-hydroxy-3'-chloro)-n-decane (6.0) | blue ←→ colorless (10° C.    45° C.) |

TABLE 11

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 46 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (6.0) | pink ←→ colorless (45° C.) |
| 47 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (8.0) | pink ←→ colorless (45° C.) |
| 48 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (10.0) | pink ←→ colorless (45° C.) |
| 49 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (12.0) | pink ←→ colorless (45° C.) |
| 50 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (15.0) | pink ←→ colorless (45° C.) |
| 51 | 3-(N-isobutyl-ethylamino)-7,8-benzofluoran (1.0) | — | stearyl alcohol/ stearyl palmitate (25.0/25.0) | 1,1-bis-(4'-hydroxyphenyl)-n-dodecane (20.0) | pink ←→ colorless (45° C.) |
| 52 | 3-(N-isobutyl-ethylamino)-7,8-benzofluoran (0.1) | — | stearyl alcohol/ stearyl palmitate (25.0/25.0) | 1,1-bis-(4'-hydroxyphenyl)-n-dodecane (20.0) | pink ←→ colorless (45° C.) |
| 53 | 3-(N-isobutyl-ethylamino)-7,8-benzofluoran (0.5) | — | stearyl alcohol/ stearyl palmitate (25.0/25.0) | 1,1-bis-(4'-hydroxyphenyl)-n-dodecane (15.0) | pink ←→ colorless (45° C.) |
| 54 | 3-(N-isobutyl-ethylamino)-7,8-benzofluoran (3.0) | — | stearyl alcohol/ stearyl palmitate (25.0/25.0) | 1,1-bis-(4'-hydroxyphenyl)-n-dodecane (8.0) | pink ←→ colorless (45° C.) |
| 55 | 3-(N-isobutyl-ethylamino)-7,8-benzofluoran (3.0) | — | stearyl alcohol/ stearyl palmitate (25.0/25.0) | 1,1-bis-(4'-hydroxyphenyl)-n-dodecane (4.5) | pink ←→ colorless (45° C.) |

TABLE 12

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 56 | 1,3-dimethyl-6-diethylamino-fluoran (3.0) | — | neopentyl stearate (50.0) | 1,1-bis-(4'-hydroxyphenyl)-n-decane (6.0) | orange ←→ colorless (14° C.   33° C.) |
| 57 | 3,3-bis-(2'-ethoxy-4'-diethylamino)-4-azaphthalide (1.0) | — | neopentyl stearate (50.0) | 1,1-bis-(4'-hydroxyphenyl)-n-decane (6.0) | bluish green ←→ colorless (14° C.   33° C.) |
| 58 | 3-(4'-diethylamino-2-ethoxyphenyl)-3-(1-ethyl-2-methyl-indol-3-yl)-4-azaphthalide (1.0) | — | neopentyl stearate (50.0) | 1,1-bis-(4'-hydroxyphenyl)-n-decane (6.0) | dark blue ←→ colorless (14° C.   33° C.) |

TABLE 12-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 59 | 2-(N-methylanilino)-6-(N-ethyl-N-p-tolylamino)fluoran (4.0) | — | neopentyl stearate (50.0) | 1,1-bis-(4'-hydroxyphenyl)-n-decane (6.0) | dark green ←→ colorless (14° C.   33° C.) |
| 60 | 3,3-bis-(1-methyl-2-n-butylindol-3-yl)phthalide (3.0) | — | neopentyl stearate (50.0) | 1,1-bis-(4'-hydroxyphenyl)-n-decane (6.0) | bluish purple ←→ colorless (14° C.   33° C.) |
| 61 | 2-(2-octoxyphenyl)-4-(4-dimethyl-aminophenyl)-6-phenyl)pyridine (3.0) | — | neopentyl stearate (50.0) | 1,1-bis-(4'-hydroxyphenyl)-n-decane (6.0) | yellow ←→ colorless (14° C.   33° C.) |

TABLE 13

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 62 | 3-(N-isobutyl-N-ethylamino)-7,8-benzofluoran (1.0) | 2,2-bis-(4-hydroxyphenyl) butane (2.0) | myristyl alcohol/butyl stearate (25.0/25.0) | 1,1-bis-(4'-hydroxyphenyl)-n-decane (6.0) | pink ←→ colorless (15° C.) |
| 63 | 3-(N-isobutyl-N-ethylamino)-7,8-benzofluoran (1.0) | 2,2-bis-(4-hydroxyphenyl) butane (2.0) | n-nonyl caprate (50.0) | 1,1-bis-(4'-hydroxyphenyl)-n-decane (6.0) | pink ←→ colorless (−7° C.   12° C.) |
| 64 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl) butane (2.0) | myristyl alcohol/butyl stearate (25.0/25.0) | 1,1-bis-(4'-hydroxyphenyl)-n-decane (8.0) | blue ←→ colorless (15° C.) |
| 65 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl) butane (2.0) | n-nonyl caprate (50.0) | 1,1-bis-(4'-hydroxyphenyl)-n-decane (8.0) | blue ←→ colorless (−7° C.   12° C.) |
| 66 | 3-(N-isobutyl-N-ethylamino)-7,8-benzofluoran (1.0) | — | myristyl alcohol/butyl stearate (25.0/25.0) | 1,1-bis-(4'-hydroxyphenyl)-n-decane (6.0) | pink ←→ colorless (15° C.) |
| 67 | 3-(N-isobutyl-N-ethylamino)-7,8-benzofluoran (1.0) | — | n-nonyl caprate (50.0) | 1,1-bis-(4'-hydroxyphenyl)-n-decane (6.0) | pink ←→ colorless (−7° C.   12° C.) |

TABLE 14

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 68 | 3-[2-ethoxy-4-(N-ethylanilino)-phenyl]-3-(1-ethyl-2-methyl-indol-3-yl)-4-azaphthalide (1.0) | — | myristyl alcohol/butyl stearate (25.0/25.0) | 1,1-bis-(4'-hydroxyphenyl)-n-decane (8.0) | blue ←→ colorless (15° C.) |
| 69 | 3-[2-ethoxy-4-(N-ethylanilino)-phenyl]-3-(1-ethyl-2-methyl-indol-3-yl)-4-azaphthalide (1.0) | — | n-nonyl caprate (50.0) | 1,1-bis-(4'-hydroxyphenyl)-n-decane) (8.0) | blue ←→ colorless (−7° C.   12° C.) |

TABLE 14-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 70 | 3-(N-isobutyl-N-ethylamino)-7,8-benzofluoran (1.0) | — | myristyl alcohol/cetyl caprate (25.0/25.0) | 1,1-bis-(4'-hydroxyphenyl)-n-decane (6.0) | pink ←→ colorless (23° C.) |
| 71 | 3-[2-ethoxy-4-(N-ethylanilino)-phenyl]-3-(1-ethyl-2-methyl-indol-3-yl)-4-azaphthalide (1.0) | — | myristyl alcohol/cetyl caprate (25.0/25.0) | 1,1-bis-(4'-hydroxyphenyl)-n-decane (8.0) | blue ←→ colorless (23° C.) |

TABLE 15

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 72 | 3-(N-isobutyl-N-ethylamino)-7,8-benzofluoran (1.0) | 2,2-bis-(4-hydroxyphenyl) butane (6.0) | stearyl alcohol (50.0) | — | pink ←→ colorless (50° C.) |
| 73 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl) butane (8.0) | myristyl alcohol/stearyl palmitate (25.0/25.0) | — | blue ←→ colorless (45° C.) |
| 74 | 2-chloro-3-methyl-6-diethylamino-fluoran (2.0) | 1,1-bis-(4-hydroxyphenyl)-propane (10.0) | tetradecy ether/stearyl caprate (25.0/25.0) | — | vermilion ←→ colorless (35° C.) |
| 75 | 2-(2-chloro-anilino)-6-di-n-butylaminofluoran (4.0) | 1,1-bis-(4-hydroxyphenyl)-2-methylpropane (12.0) | 8-penta-decane (50.0) | — | black ←→ colorless (7° C.   29° C.) |
| 76 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (6.0) | stearyl myristate (50.0) | — | blue ←→ colorless (46° C.) |

TABLE 16

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 77 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (6.0) | cetyl benzoate (50.0) | — | blue ←→ colorless (10° C.   45° C.) |
| 78 | 3-(N-isobutyl-N-ethylamino)-7,8-benzofluoran (1.0) | 2,2-bis-(4-hydroxyphenyl) propane (6.0) | steraryl alcohol/stearyl palmitate (25.0/25.0) | — | pink ←→ colorless (45° C.) |
| 79 | 1,3-dimethyl-6-diethylamino-fluoran (3.0) | 4,4'-methylene-bisphenol (6.0) | neopentyl stearate (50.0)1 | — | orange ←→ colorless (14° C.   33° C.) |
| 80 | 3,3-bis-(2'-ethoxy-4'-diethylamino)-4-azaphthalide (1.0) | 4,4'-methylene-bisphenol (6.0 | neopentyl stearate (50.0 | — | bluish green ←→ colorless (14° C.   33° C.) |

TABLE 16-continued

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 81 | 3-(4'-diethylamino-2-ethoxyphenyl)-3-(1-ethyl-2-methyl-indol-3-yl)-4-azaphthalide (1.0) | 4,4'-methylene-bisphenol (6.0) | neopentyl stearate (50.0) | — | dark blue ←→ colorless (14° C.    33° C.) |

TABLE 17

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 82 | 2-(N-methyl-anilino)-6-(N-ethyl-N-p-tolyl amino)fluoran (4.0) | 4,4'-methylene-bisphenol (6.0) | neopentyl stearate (50.0) | — | dark green ←→ colorless (14° C.    33° C.) |
| 83 | 3,3-bis-(1-methyl-2-n-butylindol-3-yl)phthalide (3.0) | 4,4'-methylene-bisphenol (6.0) | neopentyl stearate (50.0) | — | bluish purple ←→ colorless (14° C.    33° C.) |
| 84 | 2-(2-octoxyphenyl)-4-(4-dimethyl-aminophenyl)-6-phenyl)pyridine (3.0) | 4,4'-methylene-bisphenol (10.0) | neopentyl stearate (50.0) | — | yellow ←→ colorless (14° C.    33° C.) |
| 85 | 3-(N-isobutyl-N-ethylamino)-7,8-benzofluoran (1.0) | 2,2-bis-(4-hydroxyphenyl)-butane (6.0) | myristyl alcohol/ butyl stearate (25.0/25.0) | — | pink ←→ colorless (15° C.) |
| 86 | 3-(N-isobutyl-N-ethylamino)-7,8-benzofluoran (1.0) | 2,2-bis-(4-hydroxyphenyl)-butane (6.0) | n-nonyl caprylate (50.0) | — | pink ←→ colorless (-7° C.    12° C.) |
| 87 | 3-(N-isobutyl-N-ethylamino)-7,8-benzofluoran (1.0) | 2,2-bis-(4-hydroxyphenyl)-propane (6.0) | myristyl alcohol/ cetyl caprate (25.0/25.0) | — | pink ←→ colorless (23° C.) |

TABLE 18

| Composition No. | Component (a) Electron donating, color forming organic compound | Component (b) Electron accepting organic compound | Component (c) Metachromatic temperature adjuster | Component (d) Light-fastness providing agent | Color variation Develd. ←→ Extingd. Metachromatic temperature |
|---|---|---|---|---|---|
| 88 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-butane (6.0) | myristyl alcohol/ butyl stearate (25.0/25.0) | — | blue ←→ colorless (15° C.) |
| 89 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-butane (6.0) | n-nonyl caprylate (50.0) | — | blue ←→ colorless (-7° C.    12° C.) |
| 90 | 3-[2-ethoxy-4-(N-ethylanilino)-phenyl]-3-(1-ethyl-2-methyl-indol-3-yl)-4-azaphthalide (1.0) | 2,2-bis-(4-hydroxyphenyl)-propane (6.0) | myristyl alcohol/ cetyl caprate (25.0/25.0) | — | blue ←→ colorless (23° C.) |

TABLE 19

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 1 | [1] | Xenotest | Color = developed state | 40° C. | 100% | 82.0% | 68.8% | 61.0% |
| 2 | [2] | Xenotest | Color = developed state | 40° C. | 100% | 86.0% | 75.2% | 70.9% |
| 3 | [3] | Xenotest | Color = developed state | 40° C. | 100% | 90.0% | 85.8% | 80.1% |
| 4 | [4] | Xenotest | Color = developed state | 40° C. | 100% | 92.0% | 90.2% | 86.5% |
| 5 | [5] | Xenotest | Color = developed state | 40° C. | 100% | 98.0% | 95.1% | 91.2% |
| 6 | [6] | Xenotest | Color = developed state | 40° C. | 100% | 88.3% | 73.5% | 64.0% |
| 7 | [7] | Xenotest | Color = developed state | 40° C. | 100% | 90.0% | 81.3% | 74.0% |
| 8 | [8] | Xenotest | Color = developed state | 40° C. | 100% | 91.4% | 85.3% | 76.9% |
| 9 | [9] | Xenotest | Color = developed state | 40° C. | 100% | 93.0% | 88.2% | 82.7% |
| 10 | [10] | Xenotest | Color = developed state | 40° C. | 100% | 95.0% | 91.0% | 88.0% |
| 11 | [11] | Xenotest | Color = developed state | 40° C. | 100% | 99.0% | 98.2% | 96.0% |
| 12 | [12] | Xenotest | Color = developed state | 20° C. | 100% | 89.5% | 80.0% | 69.5% |
| 13 | [13] | Xenotest | Color = developed state | 20° C. | 100% | 90.6% | 84.7% | 76.8% |
| 14 | [14] | Xenotest | Color = developed state | 20° C. | 100% | 93.1% | 89.0% | 86.0% |
| 15 | [15] | Xenotest | Color = developed state | 20° C. | 100% | 99.0% | 98.5% | 97.6% |

TABLE 20

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 16 | [16] | Xenotest | Color = developed state | 20° C. | 100% | 86.4% | 75.0% | 63.3% |
| 17 | [17] | Xenotest | Color = developed state | 20° C. | 100% | 90.0% | 81.1% | 70.7% |
| 18 | [18] | Xenotest | Color = developed state | 20° C. | 100% | 91.0% | 84.4% | 75.7% |
| 19 | [19] | Xenotest | Color = developed state | 20° C. | 100% | 93.0% | 90.0% | 82.9% |
| 20 | [20] | Xenotest | Color = developed state | 20° C. | 100% | 99.5% | 98.0% | 97.1% |
| 21 | [21] | Xenotest | Color = developed state | 40° C. | 100% | 82.3% | 70.0% | 65.0% |

TABLE 20-continued

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 22 | [22] | Xenotest | Color = developed state | 40° C. | 100% | 86.0% | 76.2% | 67.5% |
| 23 | [23] | Xenotest | Color = developed state | 40° C. | 100% | 99.3% | 81.8% | 77.7% |
| 24 | [24] | Xenotest | Color = developed state | 40° C. | 100% | 93.5% | 90.0% | 84.4% |
| 25 | [25] | Xenotest | Color = developed state | 40° C. | 100% | 94.8% | 91.6% | 87.8% |
| 26 | [26] | Xenotest | Color = developed state | 40° C. | 100% | 90.0% | 84.2% | 81.2% |
| 27 | [27] | Xenotest | Color = developed state | 40° C. | 100% | 91.1% | 83.3% | 73.1% |
| 28 | [28] | Xenotest | Color = developed state | 40° C. | 100% | 88.8% | 80.3% | 70.5% |
| 29 | [29] | Xenotest | Color = developed state | 40° C. | 100% | 85.2% | 78.4% | 67.6% |
| 30 | [30] | Xenotest | Color = developed state | 40° C. | 100% | 90.0% | 83.5% | 76.0% |

TABLE 21

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 31 | [31] | Xenotest | Color = developed state | 40° C. | 100% | 92.0% | 86.7% | 82.4% |
| 32 | [32] | Xenotest | Color = developed state | 40° C. | 100% | 89.8% | 83.1% | 80.0% |
| 33 | [33] | Xenotest | Color = developed state | 40° C. | 100% | 94.1% | 90.0% | 86.3% |
| 34 | [34] | Xenotest | Color = developed state | 40° C. | 100% | 97.7% | 95.6% | 93.0% |
| 35 | [35] | Xenotest | Color = developed state | 40° C. | 100% | 95.5% | 92.7% | 89.8% |
| 36 | [36] | Xenotest | Color = developed state | 40° C. | 100% | 98.8% | 97.0% | 96.0% |
| 37 | [37] | Xenotest | Color = developed state | 40° C. | 100% | 99.0% | 98.2% | 97.7% |
| 38 | [38] | Xenotest | Color = developed state | 40° C. | 100% | 98.5% | 97.0% | 94.0% |
| 39 | [39] | Xenotest | Color = developed state | 40° C. | 100% | 98.0% | 96.1% | 91.6% |
| 40 | [40] | Xenotest | Color = developed state | 40° C. | 100% | 92.3% | 89.0% | 83.0% |
| 41 | [41] | Xenotest | Color = developed state | 40° C. | 100% | 90.2% | 84.4% | 76.6% |
| 42 | [42] | Xenotest | Color = developed state | 40° C. | 100% | 98.1% | 94.8% | 90.3% |

TABLE 21-continued

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 43 | [43] | Xenotest | Color = developed state | 40° C. | 100% | 93.6% | 88.8% | 83.3% |
| 44 | [44] | Xenotest | Color = developed state | 40° C. | 100% | 90.0% | 82.3% | 76.1% |
| 45 | [45] | Xenotest | Color = developed state | 40° C. | 100% | 88.7% | 81.0% | 70.5% |

TABLE 22

| Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 46 | [46] | Xenotest | Color = developed state | 40° C. | 100% | 97.0% | 94.4% | 90.5% |
| 47 | [47] | Xenotest | Color = developed state | 40° C. | 100% | 98.0% | 95.6% | 94.2% |
| 48 | [48] | Xenotest | Color = developed state | 40° C. | 100% | 98.6% | 97.5% | 96.6% |
| 49 | [49] | Xenotest | Color = developed state | 40° C. | 100% | 99.0% | 98.0% | 97.3% |
| 50 | [50] | Xenotest | Color = developed state | 40° C. | 100% | 100% | 98.5% | 98.0% |
| 51 | [51] | Xenotest | Color = developed state | 40° C. | 100% | 100% | 100% | 98.5% |
| 52 | [52] | Xenotest | Color = developed state | 40° C. | 100% | 96.5% | 94.0% | 92.3% |
| 53 | [53] | Xenotest | Color = developed state | 40° C. | 100% | 98.0% | 95.8% | 93.0% |
| 54 | [54] | Xenotest | Color = developed state | 40° C. | 100% | 98.2% | 96.4% | 95.1% |
| 55 | [55] | Xenotest | Color = developed state | 40° C. | 100% | 91.2% | 83.9% | 78.0% |
| 56 | [56] | Xenotest | Color = developed state | 20° C. | 100% | 91.5% | 84.5% | 73.3% |
| 57 | [57] | Xenotest | Color = developed state | 20° C. | 100% | 97.7% | 95.8% | 94.4% |
| 58 | [58] | Xenotest | Color = developed state | 20° C. | 100% | 99.2% | 98.8% | 98.0% |
| 59 | [59] | Xenotest | Color = developed state | 20° C. | 100% | 93.6% | 89.0% | 82.0% |
| 60 | [60] | Xenotest | Color = developed state | 20° C. | 100% | 92.9% | 87.7% | 79.0% |
| 61 | [61] | Xenotest | Color = developed state | 20° C. | 100% | 90.2% | 80.6% | 68.8% |

TABLE 23

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 62 | [1] | Northlight test | 20° C. | Color = developed state | 100% | 92.2% | 83.2% | 72.4% | 66.3% | 60.2% |
| 63 | [2] | Northlight test | 20° C. | Color = developed state | 100% | 93.8% | 86.7% | 75.6% | 69.7% | 64.4% |
| 64 | [3] | Northlight test | 20° C. | Color = developed state | 100% | 94.9% | 90.0% | 84.2% | 80.3% | 77.8% |
| 65 | [4] | Northiight test | 20° C. | Color = developed state | 100% | 96.7% | 93.8% | 91.3% | 87.7% | 84.2% |
| 66 | [5] | Northiight test | 20° C. | Color = developed state | 100% | 98.5% | 96.3% | 95.0% | 93.3% | 91.2% |
| 67 | [6] | Northlight test | 20° C. | Color = developed state | 100% | 92.0% | 82.1% | 73.3% | 68.3% | 63.2% |
| 68 | [7] | Northlight test | 20° C. | Color = developed state | 100% | 94.6% | 90.6% | 83.4% | 77.1% | 72.6% |
| 69 | [8] | Northlight test | 20° C. | Color = developed state | 100% | 95.3% | 91.6% | 87.0% | 81.8% | 76.2% |
| 70 | [9] | Northlight test | 20° C. | Color = developed state | 100% | 96.3% | 93.0% | 89.9% | 86.4% | 81.6% |
| 71 | [10] | Northlight test | 20° C. | Color = developed state | 100% | 98.3% | 95.7% | 92.1% | 90.0% | 86.2% |
| 72 | [111 | Northlight test | 20° C. | Color = developed state | 100% | 99.1% | 98.2% | 96.7% | 95.0% | 93.3% |
| 73 | [12] | Northlight test | 20° C. | Color = developed state | 100% | 93.6% | 89.8% | 84.1% | 79.1% | 70.5% |
| 74 | [13] | Northlight test | 20° C. | Color = developed state | 100% | 96.0% | 92.5% | 88.4% | 84.7% | 77.9% |
| 75 | [14] | Northlight test | 20° C. | Color = developed state | 100% | 98.6% | 94.5% | 92.0% | 89.0% | 85.6% |
| 76 | [15] | Northlight test | 20° C. | Color = developed state | 100% | 100% | 98.9% | 98.0% | 97.4% | 96.0% |

TABLE 24

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 77 | [16] | Northlight test | 20° C. | Color = developed state | 100% | 88.2% | 82.9% | 75.4% | 68.8% | 61.2% |
| 78 | [17] | Northlight test | 20° C. | Color = developed state | 100% | 90.0% | 86.2% | 78.9% | 70.7% | 65.9% |
| 79 | [18] | Northlight test | 20° C. | Color = developed state | 100% | 93.0% | 90.4% | 86.7% | 80.9% | 78.0% |
| 80 | [19] | Northlight test | 20° C. | Color = developed state | 100% | 96.7% | 94.3% | 91.0% | 87.7% | 83.0% |

TABLE 24-continued

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 81 | [201] | Northlight test | 20° C. | Color = developed state | 100% | 99.0% | 98.8% | 96.8% | 93.1% | 89.0% |
| 82 | [21] | Northlight test | 20° C. | Color = developed state | 100% | 91.6% | 87.4% | 78.7% | 73.1% | 66.3% |
| 83 | [22] | Northlight test | 20° C. | Color = developed state | 100% | 94.3% | 88.9% | 82.4% | 76.9% | 70.7% |
| 84 | [23] | Northlight test | 20° C. | Color = developed state | 100% | 96.0% | 92.0% | 88.6% | 82.7% | 78.2% |
| 85 | [24] | Northlight test | 20° C. | Color = developed state | 100% | 97.0% | 94.3% | 90.7% | 85.7% | 82.1% |
| 86 | [25] | Northlight test | 20° C. | Color = developed state | 100% | 97.6% | 94.5% | 92.0% | 90.0% | 87.0% |
| 87 | [26] | Northlight test | 20° C. | Color = developed state | 100% | 91.0% | 86.2% | 80.4% | 76.7% | 70.1% |
| 88 | [27] | Northlight test | 20° C. | Color = developed state | 100% | 95.0% | 92.6% | 88.7% | 81.9% | 77.9% |
| 89 | [28] | Northlight test | 20° C. | Color = developed state | 100% | 89.8% | 82.2% | 78.4% | 74.1% | 67.3% |
| 90 | [29] | Northlight test | 20° C. | Color = developed state | 100% | 96.1% | 91.3% | 87.0% | 81.6% | 76.9% |
| 91 | [30] | Northlight test | 20° C. | Color = developed state | 100% | 96.5% | 92.0% | 88.3% | 85.4% | 80.1% |

TABLE 25

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 92 | [31] | Northlight test | 20° C. | Color = developed state | 100% | 96.8% | 92.3% | 89.5% | 86.6% | 83.0% |
| 93 | [32] | Northlight test | 20° C. | Color = developed state | 100% | 95.2% | 91.6% | 87.4% | 82.9% | 80.1% |
| 94 | [33] | Northlight test | 20° C. | Color = developed state | 100% | 97.0% | 93.4% | 91.2% | 88.5% | 86.3% |
| 95 | [34] | Northlight test | 20° C. | Color = developed state | 100% | 98.0% | 97.1% | 95.3% | 93.6% | 92.7% |
| 96 | [35] | Northlight test | 20° C. | Color = developed state | 100% | 94.3% | 91.7% | 88.2% | 85.9% | 83.8% |
| 97 | [36] | Northlight test | 20° C. | Color = developed state | 100% | 98.2% | 97.4% | 96.1% | 94.0% | 92.3% |
| 98 | [37] | Northlight test | 20° C. | Color = developed state | 100% | 99.0% | 98.0% | 97.2% | 96.0% | 94.4% |
| 99 | [38] | Northlight test | 20° C. | Color = developed state | 100% | 98.8% | 98.0% | 97.4% | 95.8% | 94.6% |

TABLE 25-continued

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 100 | [39] | Northlight test | 20° C. | Color = developed state | 100% | 98.0% | 96.8% | 95.5% | 94.2% | 92.2% |
| 101 | [40] | Northlight test | 20° C. | Color = developed state | 100% | 95.0% | 92.6% | 90.3% | 88.2% | 85.7% |
| 102 | [41] | Northlight test | 20° C. | Color = developed state | 100% | 94.4% | 90.8% | 86.7% | 83.8% | 79.9% |
| 103 | [42] | Northlight test | 20° C. | Color = developed state | 100% | 98.2% | 97.3% | 95.2% | 93.2% | 91.5% |
| 104 | [43] | Northlight test | 20° C. | Color = developed state | 100% | 97.8% | 96.4% | 94.6% | 92.0% | 89.8% |
| 105 | [44] | Northlight test | 20° C. | Color = developed state | 100% | 95.2% | 91.8% | 87.7% | 84.6% | 80.4% |
| 106 | [45] | Northlight test | 20° C. | Color = developed state | 100% | 90.5% | 86.0% | 83.8% | 80.2% | 77.7% |

TABLE 26

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 107 | [46] | Northlight test | 20° C. | Color = developed state | 100% | 97.0% | 96.1% | 93.4% | 91.0% | 80.9% |
| 108 | [47] | Northlight test | 20° C. | Color = developed state | 100% | 98.0% | 97.0% | 94.2% | 91.5% | 80.0% |
| 109 | [48] | Northlight test | 20° C. | Color = developed state | 100% | 99.3% | 98.4% | 96.5% | 94.0% | 91.0% |
| 110 | [49] | Northlight test | 20° C. | Color = developed state | 100% | 100% | 99.0% | 98.2% | 96.8% | 91.0% |
| 111 | [50] | Northlight test | 20° C. | Color = developed state | 100% | 100% | 100% | 99.5% | 98.0% | 97.2% |
| 112 | [51] | Northiight test | 20° C. | Color = developed state | 100% | 100% | 100% | 100% | 98.9% | 98.2% |
| 113 | [52] | Northlight test | 20° C. | Color = developed state | 100% | 99.5% | 97.7% | 95.4% | 93.8% | 92.8% |
| 114 | [53] | Northlight test | 20° C. | Color = developed state | 100% | 99.0% | 98.0% | 96.9% | 96.0% | 94.0% |
| 115 | [54] | Northlight test | 20° C. | Color = developed state | 100% | 98.8% | 96.7% | 95.5% | 92.6% | 90.0% |
| 116 | [55] | Northlight test | 20° C. | Color = developed state | 100% | 96.1% | 90.4% | 86.6% | 83.0% | 79.1% |
| 117 | [56] | Northlight test | 20° C. | Color = developed state | 100% | 98.0% | 95.6% | 92.7% | 86.4% | 80.1% |
| 118 | [57] | Northlight test | 20° C. | Color = developed state | 100% | 99.1% | 98.5% | 96.7% | 95.1% | 93.8% |

TABLE 26-continued

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 119 | [58] | Northlight test | 20° C. | Color = developed state | 100% | 100% | 99.4% | 98.7% | 97.3% | 96.6% |
| 120 | [59] | Northlight test | 20° C. | Color = developed state | 100% | 97.2% | 95.4% | 92.4% | 89.8% | 86.0% |
| 121 | [60] | Northlight test | 20° C | Color = developed state | 100% | 94.6% | 92.2% | 88.8% | 85.7% | 80.3% |
| 122 | [61] | Northlight test | 20° C. | Color = developed state | 100% | 90.9% | 86.5% | 81.7% | 78.2% | 70.4% |

TABLE 27

| Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 123 | [46] | Northlight test | 20° C. | Color = developed state | 100% | 97.0% | 96.1% | 93.4% | 91.0% | 80.9% |
| 124 | [63] | Northlight test | 5° C. | Color = developed state | 100% | 93.7% | 88.2% | 84.2% | 80.1% | 76.0% |
| 125 | [64] | Northlight test | 5° C. | Color = developed state | 100% | 96.5% | 93.2% | 89.5% | 86.0% | 81.8% |
| 126 | [651 | Northlight test | 5° C. | Color = developed state | 100% | 95.0% | 91.8% | 87.7% | 83.0% | 78.9% |
| 127 | [66] | Northlight test | 5° C. | Color = developed state | 100% | 98.3% | 97.4% | 95.0% | 93.2% | 91.7% |
| 128 | [67] | Northlight test | 5° C. | Color = developed state | 100% | 96.6% | 95.0% | 92.6% | 90.0% | 86.1% |
| 129 | [68] | Northlight test | 5° C. | Color = developed state | 100% | 98.3% | 97.0% | 95.5% | 93.3% | 91.8% |
| 130 | [69] | Northlight test | 5° C. | Color = developed state | 100% | 97.0% | 96.4% | 94.0% | 92.1% | 88.8% |
| 131 | [70] | Northlight test | 20° C. | Color = developed state | 100% | 95.6% | 93.4% | 90.8% | 87.2% | 83.9% |
| 132 | [71] | Northlight test | 20° C. | Color = developed state | 100% | 96.0% | 94.4% | 91.2% | 86.9% | 82.2% |

TABLE 28

| Comparative Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 1 | [72] | Xenotest | Color = developed state | 40° C. | 100% | 60.3% | 40.3% | 33.0% |
| 2 | [73] | Xenotest | Color = developed state | 40° C. | 100% | 69.0% | 42.1% | 27.8% |

TABLE 28-continued

| Comparative Example No. | Composition No. | Type of test on light-fastness | State of light-fastness test sample | Xenotest in-machine temp. | Light-fastness test results (coloring density retention) Exposure time | | | |
|---|---|---|---|---|---|---|---|---|
| | | | | | 0 hr | 10 hrs | 20 hrs | 30 hrs |
| 3 | [74] | Xenotest | Color = developed state | 20° C. | 100% | 64.4% | 40.0% | 28.3% |
| 4 | [75] | Xenotest | Color = developed state | 20° C. | 100% | 59.7% | 38.6% | 21.2% |
| 5 | [76] | Xenotest | Color = developed state | 40° C. | 100% | 67.2% | 41.8% | 25.5% |
| 6 | [77] | Xenotest | Color = developed state | 40° C. | 100% | 68.1% | 42.0% | 24.1% |
| 7 | [78] | Xenotest | Color = developed state | 40° C. | 100% | 66.0% | 43.3% | 30.9% |
| 8 | [79] | Xenotest | Color = developed state | 20° C. | 100% | 59.7% | 38.8% | 20.5% |
| 9 | [80] | Xenotest | Color = developed state | 20° C. | 100% | 68.3% | 46.4% | 34.2% |
| 10 | [81] | Xenotest | Color = developed state | 20° C. | 100% | 76.4% | 60.2% | 51.8% |
| 11 | [82] | Xenotest | Color = developed state | 20° C. | 100% | 59.8% | 39.7% | 20.5% |
| 12 | [83] | Xenotest | Color = developed state | 20° C. | 100% | 62.1% | 41.8% | 30.0% |
| 13 | [84] | Xenotest | Color = developed state | 20° C. | 100% | 55.5% | 30.2% | 18.6% |

TABLE 29

| Comparative Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 14 | [72] | Northlight test | 20° C. | Color = developed state | 100% | 80.1% | 64.8% | 49.7% | 35.6% | 29.0% |
| 15 | [73] | Northlight test | 20° C. | Color = developed state | 100% | 86.9% | 65.4% | 48.9% | 38.0% | 29.3% |
| 16 | [74] | Northlight test | 20° C. | Color = developed state | 100% | 80.4% | 63.2% | 50.1% | 43.8% | 35.5% |
| 17 | [75] | Northlight test | 20° C. | Color = developed state | 100% | 78.6% | 63.7% | 52.2% | 40.4% | 22.4% |
| 18 | [76] | Northlight test | 20° C. | Color = developed state | 100% | 80.0% | 64.2% | 47.4% | 35.8% | 27.7% |
| 19 | [77] | Northlight test | 20° C. | Color = developed state | 100% | 80.9% | 64.1% | 46.5% | 34.0% | 28.8% |
| 20 | [78] | Northlight test | 20° C. | Color = developed state | 100% | 79.4% | 60.9% | 50.8% | 36.0% | 30.0% |
| 21 | [79] | Northlight test | 20° C. | Color = developed state | 100% | 69.5% | 54.3% | 45.1% | 38.0% | 29.1% |
| 22 | [80] | Northlight test | 20° C. | Color = developed state | 100% | 83.7% | 65.2% | 50.8% | 41.8% | 34.0% |

TABLE 29-continued

| Comparative Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 23 | [81] | Northlight test | 20° C. | Color = developed state | 100% | 85.6% | 73.4% | 65.6% | 55.8% | 47.7% |
| 24 | [82] | Northlight test | 20° C. | Color = developed state | 100% | 79.7% | 66.3% | 52.0% | 32.9% | 22.8% |
| 25 | [83] | Northlight test | 20° C. | Color = developed state | 100% | 76.0% | 60.1% | 48.9% | 36.0% | 25.1% |
| 26 | [84] | Northlight test | 20° C. | Color = developed state | 100% | 60.4% | 46.2% | 38.6% | 30.4% | 19.0% |

TABLE 30

| Comparative Example No. | Composition No. | Type of test on light-fastness | Ambient temp. | State of light-fastness test sample | Light-fastness test results (coloring density retention) Exposure days | | | | | |
|---|---|---|---|---|---|---|---|---|---|---|
| | | | | | 0 day/ | 14 days/ | 28 days/ | 42 days/ | 56 days/ | 70 days |
| 27 | [85] | Northlight test | 5° C. | Color = developed state | 100% | 79.8% | 63.3% | 47.8% | 36.0% | 29.9% |
| 28 | [86] | Northlight test | 5° C. | Color = developed state | 100% | 80.1% | 64.4% | 49.9% | 37.7% | 31.3% |
| 29 | [87] | Northlight test | 20° C. | Color = developed state | 100% | 78.5% | 63.8% | 47.4% | 39.1% | 33.9% |
| 30 | [88] | Northlight test | 5° C. | Color = developed state | 100% | 84.7% | 70.2% | 60.5% | 50.7% | 43.6% |
| 31 | [89] | Northlight test | 5° C. | Color = developed state | 100% | 80.6% | 69.5% | 53.3% | 40.6% | 32.4% |
| 32 | [90] | Northlight test | 20° C. | Color = developed state | 100% | 83.3% | 72.8% | 63.9% | 52.1% | 45.0% |

What is claimed is:

1. A reversible thermochromic composition comprising a composition formed by blending:
   (a) an electron donating compound;
   (b) an electron accepting compound;
   (c) a metachromatic temperature adjuster; and
   (d) 0.3–70 parts by weight of an electron accepting, light-fastness providing agent represented by Formula I based on 1.0 part by weight of the component-(a) electron donating compound:

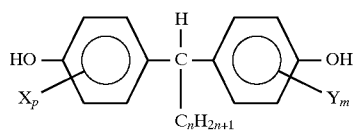

wherein n represents an integer of 5 to 17 to form a straight-chain or branched alkyl group; X and Y independently represent a straight-chain or branched alkyl group having 1 to 4 carbon atoms, or a halogen atom; and p and m independently represent an integer of 0 to 3.

2. The method according to claim 1, wherein the amount of the component-(b) electron accepting compound used is controlled by mixing the component-(d) light-fastness providing agent.

3. The method according to claim 1, wherein the component-(d) electron accepting, light-fastness providing agent is used in an amount of 2.0 part by weight to 7.0 parts by weight based on 1.0 part by weight of the component-(a) electron donating compound.

4. The method according to claim 1, wherein the components (a) to (d) are enclosed in microcapsules.

5. The method according to claim 1, wherein the components (a) to (d) are dispersed in a resin binder.

6. A reversible thermochromic composition comprising a composition formed by blending:
   (a) an electron donating compound;
   (b) 0.3–70 parts by weight of an electron accepting compound based on 1.0 part by weight of the component-(a) electron donating compound; and
   (c) a metachromatic temperature adjuster,
   said electron accepting compound being a light-fastness providing agent represented by Formula I:

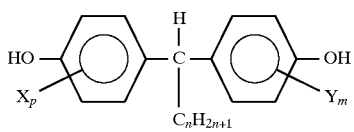

wherein n represents an integer of 5 to 17 to form a straight-chain or branched alkyl group; X and Y independently represent a straight-chain or branched alkyl group having 1 to 4 carbon atoms, or a halogen atom; and p and m independently represent an integer of 0 to 3.

7. The method according to claim 6, wherein the component-(b) electron accepting compound is used in an amount of 2.0 part by weight to 7.0 parts by weight based on 1.0 part by weight of the component-(a) electron donating compound.

8. The method according to claim 6, wherein the components (a) to (c) are enclosed in microcapsules.

9. The method according to claim 6, wherein the components (a) to (c) are dispersed in a resin binder.

* * * * *